(12) United States Patent
Miyazawa et al.

(10) Patent No.: US 10,903,691 B2
(45) Date of Patent: Jan. 26, 2021

(54) WIRELESS POWER RECEIVER AND WIRELESS POWER TRANSMISSION SYSTEM USING THE SAME

(71) Applicant: TDK Corporation, Tokyo (JP)

(72) Inventors: Ryo Miyazawa, Tokyo (JP); Masahide Ohnishi, Tokyo (JP); Akihiro Ii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 208 days.

(21) Appl. No.: 16/202,092

(22) Filed: Nov. 28, 2018

(65) Prior Publication Data

US 2019/0165611 A1    May 30, 2019

(30) Foreign Application Priority Data

Nov. 29, 2017  (JP) .................................. 2017-229491
Oct. 11, 2018  (JP) .................................. 2018-192271

(51) Int. Cl.
| | |
|---|---|
| *H02J 50/12* | (2016.01) |
| *H02M 7/06* | (2006.01) |
| *H02M 1/32* | (2007.01) |
| *H02J 7/02* | (2016.01) |
| *H02M 3/335* | (2006.01) |
| *H02M 7/5387* | (2007.01) |
| *H02M 1/00* | (2006.01) |

(52) U.S. Cl.
CPC .............. *H02J 50/12* (2016.02); *H02M 1/32* (2013.01); *H02M 3/335* (2013.01); *H02M 7/06* (2013.01); *H02J 7/025* (2013.01); *H02J 2207/20* (2020.01); *H02M 7/5387* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| 9,843,199 | B2 * | 12/2017 | Bosshard | ................ B60L 53/22 |
| 2017/0207662 | A1 * | 7/2017 | Kanagawa | .............. H02M 3/28 |
| 2018/0115193 | A1 * | 4/2018 | Hwang | .................. H02J 50/40 |
| 2018/0159380 | A1 | 6/2018 | Ii | |

FOREIGN PATENT DOCUMENTS

| | | |
|---|---|---|
| JP | 2018093692 A | 6/2018 |
| WO | 2013136409 A1 | 9/2013 |
| WO | 2016159093 A1 | 6/2016 |

* cited by examiner

*Primary Examiner* — Jared Fureman
*Assistant Examiner* — Joel Barnett
(74) *Attorney, Agent, or Firm* — Young Law Firm, P.C.

(57) ABSTRACT

A wireless power receiver is provided with a power reception unit, a rectifier circuit including first to fourth diodes and first and second capacitors and converting AC power into DC, an anode of the first diode and a cathode of the second diode being connected to one output end of the power reception unit, an anode of the third diode and a cathode of the fourth diode being connected to the other output end thereof, and first and second capacitors being connected in parallel, respectively, to the third and fourth diodes, a protection circuit including a first switching element connected between the other output end of the power reception unit and an output end of the rectifier circuit, and a control circuit that controls the first switching element based on output voltage of the rectifier circuit and inter-terminal voltage of the first or second capacitor.

19 Claims, 23 Drawing Sheets

US 10,903,691 B2

WIRELESS POWER RECEIVER AND WIRELESS POWER TRANSMISSION SYSTEM USING THE SAME

BACKGROUND OF THE INVENTION

Field of the Invention

The present invention relates to a wireless power receiver that receives power transmitted wirelessly from a power transmission side and a wireless power transmission system using the same.

Description of Related Art

In recent years, wireless power transmission technology has attracted attention as a technique for charging a battery for an electric car. The wireless power transmission technology has a problem in that power transmission efficiency is deteriorated due to an impedance variation occurring in accordance with a load state. To solve this problem, for example, International Publication No. 2013/136409 proposes a technique that suppresses deterioration in power transmission efficiency based on detected impedance of a charging part. Specifically, when the detected impedance is comparatively low, a bridge rectifier circuit is selected, while when the detected impedance is comparatively high, a double-voltage rectifier circuit is selected.

However, the technique disclosed in International Publication No. 2013/136409 requires hardware such as a switch for selecting between the bridge rectifier circuit and the double-voltage rectifier circuit, a detection part for detecting the impedance of the charging part, and a control circuit for controlling ON/OFF of the switch. In particular, when power to be managed is large, a large size switch is required, causing disadvantages in terms of cost and installation space. Further, in terms of software, an active control algorism for detecting the impedance of a load and controlling the ON/OFF timing of the switch is required, and this complicates the system.

In wireless power transmission systems, abnormalities such as overvoltage may occur on a power receiving side during power transmission. Thus, the power transmission systems are provided with a protection circuit for protecting circuit elements from such abnormalities. For example, International Publication No. 2016/159093 proposes a protection circuit using switching elements that protects a rectifier circuit from overvoltage. The protection circuit disclosed in International Publication No. 2016/159093 includes switching elements connected between the output part of a power receiving side resonance circuit and the output part of the rectifier circuit and a rectifier element, wherein when the value of an output voltage detected by a power receiving side voltage detection part exceeds a preset reference voltage value, the switching elements are activated to short the circuit to thereby protect the circuit elements from overvoltage.

When the protection circuit of International Publication No. 2016/159093 is applied to the wireless power transmission system of International Publication No. 2013/136409, it is possible to prevent deterioration in power transmission efficiency due to impedance variations and to protect circuit elements constituting a rectifier circuit, etc., from overvoltage.

However, in a wireless power receiver obtained by combining the bridge rectifier circuit and the double-voltage rectifier circuit, an excessively large current may flow in a switching element constituting the protection circuit depending on the operation timing of the protection circuit, and just incorporating the protection circuit into the power receiver is not enough to prevent this problem. To cope with this, a method of using elements capable of withstanding a large current can be considered; in this case, the device size and device cost may be increased. Thus, a technique for suppressing an excessive current from flowing to elements constituting the protection circuit without involving an increase in the device size and cost is desired.

SUMMARY

The present invention has been made in view of the above situation, and the object thereof is to provide a wireless power receiver and a wireless power transmission system capable of, upon occurrence of overvoltage, protecting circuit elements constituting the protection circuit itself while protecting circuit elements constituting the device.

To solve the above problems, a wireless power receiver according to the present invention includes: a power reception unit including a power reception coil; a rectifier circuit including a first diode whose anode is connected to one output end of the power reception unit, a second diode whose cathode is connected to the one output end, a third diode whose anode is connected to the other output end of the power reception unit, a fourth diode whose cathode is connected to the other output end, and first and second capacitors connected in parallel, respectively, to the third and fourth diodes and configured to convert AC power received by the power reception coil into DC power; a protection circuit including a first switching element connected between the other output end of the power reception unit and an output end of the rectifier circuit; and a control circuit that controls ON/OFF operation of the first switching element based on an output voltage of the rectifier circuit and an inter-terminal voltage of the first capacitor or second capacitor.

A wireless power transmission system according to the present invention includes a wireless power transmitter and the above-described wireless power receiver according to the present invention. The wireless power transmitter includes an inverter that converts DC power into AC power, a power transmission unit including a power transmission coil that receives the AC power and generates an AC magnetic field, a current detection circuit that detects current output from the inverter, and a power transmission control circuit that controls the operation of the inverter. The power transmission control circuit stops the operation of the inverter when the current detected by the current detection circuit exceeds a threshold current.

BRIEF DESCRIPTION OF DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiment of the present invention will be described in detail below with reference to the accompanying drawings.

Figure 1:
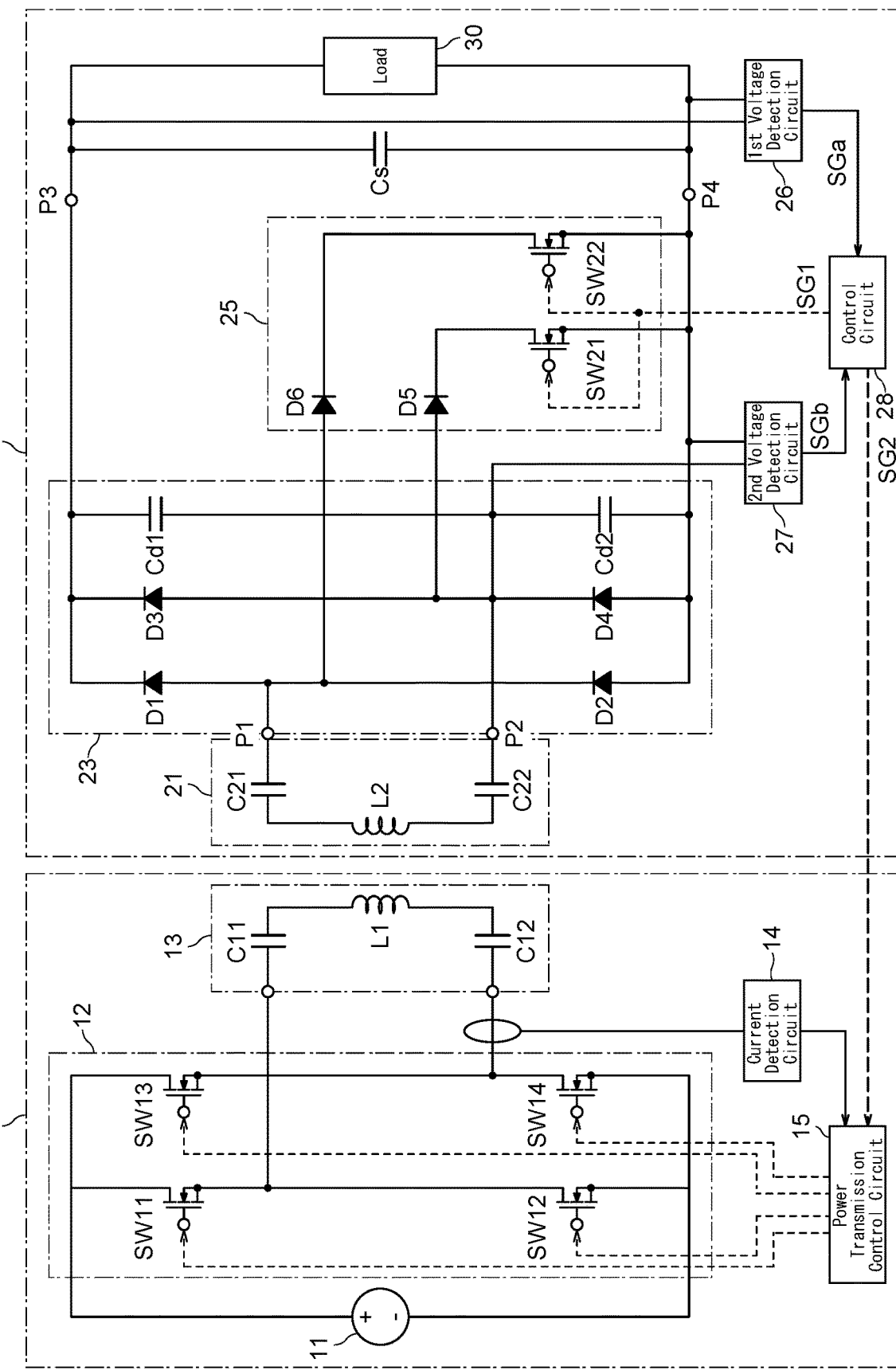
FIG. 1 is a circuit diagram showing the whole of a wireless power transmission system according to a first embodiment of the present invention.

FIG. 1 is a circuit diagram showing the whole of a wireless power transmission system according to a first embodiment of the present invention.

As illustrated in FIG. 1, a wireless power transmission system 1 is constituted of a combination of a wireless power transmitter 10 and a wireless power receiver 20 and is configured to transmit wirelessly power from the wireless power transmitter 10 to the wireless power receiver 20.

The wireless power transmitter 10 includes an inverter 12 that converts DC power supplied from a DC power supply 11 into AC power and a power transmission unit 13 that receives AC voltage to generate magnetic flux. The inverter 12 is a full-bridge type switching circuit in which four switching elements SW11 to SW14 are bridge-connected. The switching elements SW11 to SW14 may be, e.g., MOSFETs. The ON/OFF operation of the switching elements SW11 to SW14 is controlled by a switching control signal supplied from a power transmission control circuit 15. By ON/OFF controlling the switching elements SW11 to SW14, DC power is converted into AC power of, e.g., 100 kHz.

The power transmission unit 13 includes a power transmission coil L1 and capacitors C11 and C12. The power transmission coil L1 is, e.g., a flat coil or a solenoid coil formed using a litz wire obtained by twisting a plurality of conductive wires or a single wire. The power transmission coil L1 constitutes an LC resonance circuit together with the capacitors C11 and C12. The capacitors C11 and C12 are, e.g., ceramic capacitors and have a function of adjusting the resonance frequency of the LC resonance circuit. In the present embodiment, the capacitors C11 and C12 are connected in series respectively to one and the other ends of the power transmission coil L1; alternatively, however, at least one of the capacitors C11 and C12 may be connected in parallel to the power transmission coil L1, or one or both of the capacitors C11 and C12 may be omitted. The thus configured power transmission coil L1 of the power transmission unit 13 receives AC power supplied from the inverter 12 to generate an AC magnetic field.

The wireless power transmitter 10 according to the present embodiment further includes a current detection circuit 14 that detects current output from the inverter 12. The current detection circuit 14 outputs an abnormality detection signal when detecting an overcurrent exceeding a threshold value and supplies the abnormality detection signal to the power transmission control circuit 15. Upon inputting the abnormality detection signal, the power transmission control circuit 15 stops the switching operation of the switching elements SW11 to SW14, thus making it possible to prevent the abnormal operation of the wireless power transmitter 10 and thus to enhance system safety. Further, the abnormality is detected to stop power transmission operation on the wireless power transmitter 10 side, thus making it possible to quickly protect elements constituting a protection circuit in the wireless power receiver 20 to be described later.

Next, the wireless power receiver 20 will be described. The wireless power receiver 20 includes a power reception unit 21 that takes in AC power through the magnetic field generated by the power transmission coil L1, a rectifier circuit 23 that converts AC power received by the power reception unit 21 into DC power, a protection circuit 25 that protects the rectifier circuit 23 from overvoltage, a first voltage detection circuit 26 that monitors the output voltage of the rectifier circuit 23, a second voltage detection circuit 27 that monitors the inter-terminal voltage (i.e., voltage at an input end P2 of the rectifier circuit 23 connected to the power reception unit 21) of a second capacitor Cd2 included in the rectifier circuit 23, and a control circuit 28 that controls the operation of the protection circuit 25 based on detection results from the first and second voltage detection circuits 26 and 27.

The power reception unit 21 includes a power reception coil L2 and capacitors C21 and C22. The power reception unit 21 can have a configuration similar to or same as that of the power transmission unit 13 or may be configured differently from the power transmission unit 13. The power reception coil L2 is magnetically coupled to the power transmission coil L1 of the power transmission unit 13 to generate AC power.

The rectifier circuit 23 includes four bridge-connected diodes D1 to D4 and capacitors Cd1 and Cd2 connected respectively in parallel to the diodes D3 and D4. The diodes D1 to D4 constitute a full-bridge rectifier circuit. While details will be described, the capacitors Cd1 and Cd2 constitute a double-voltage rectifier circuit together with the diodes D1 and D2.

The anode of the diode D1 and the cathode of the diode D2 constitute one input end P1 of the rectifier circuit 23 and are connected to one output end of the power reception unit 21. The anode of the diode D3 and the cathode of the diode D4 constitute the other input end P2 of the rectifier circuit 23 and are connected to the other output end of the power reception unit 21. The cathodes of the respective diodes D1 and D3 constitute one output end P3 of the rectifier circuit 23, and the anodes of the respective diodes D2 and D4 constitute the other output end P4 of the rectifier circuit 23. When the output end P4 of the rectifier circuit 23 is grounded, the output end P3 serves as a positive-side output end, and the output end P4 serves as a negative-side output end. A smoothing capacitor Cs is connected in parallel between the pair of output ends P3 and P4 of the rectifier circuit 23. Further, a battery, etc., is connected between the pair of output ends P3 and P4 of the rectifier circuit 23 as a load 30 and is charged by power received by the wireless power receiver 20.

The protection circuit 25 includes two switching elements SW21 and SW22 and two diodes D5 and D6. The switching element SW21 (first switching element) is provided between the input end P2 (the other output end of the power reception unit 21) of the rectifier circuit 23 and the output end P4 of the rectifier circuit 23, and the switching element SW22 (second switching element) is provided between the input end P1 (one output end of the power reception unit 21) of the rectifier circuit 23 and the output end P4 of the rectifier circuit 23. The ON/OFF operation of the switching elements SW21 and SW22 is controlled by a control signal SG1 from the control circuit 28.

The diode D5 (first rectifier element) is connected in series to the switching element SW21 such that the anode thereof faces the input end P2 (the other output end of the power reception unit 21) of the rectifier circuit 23 and that the cathode thereof faces the output end P4 of the rectifier circuit 23. That is, the diode D5 is connected forward to the output end P4 of the rectifier circuit 23. Although the diode D5 is provided on the side closer to the input end of the rectifier circuit 23 than the switching element SW21 is, it may be provided on the side closer to the output end of the rectifier circuit 23 than the switching element SW21 is.

The diode D6 (second rectifier element) is connected in series to the switching element SW22 such that the anode thereof faces the input end P1 (the other output end of the power reception unit 21) of the rectifier circuit 23 and that the cathode thereof faces the output end P4 of the rectifier circuit 23. That is, the diode D6 is connected forward to the output end P4 of the rectifier circuit 23. Although the diode D6 is provided on the side closer to the input end of the rectifier circuit 23 than the switching element SW22 is, it may be provided on the side closer to the output end of the rectifier circuit 23 than the switching element SW22 is.

The first voltage detection circuit 26 monitors the output voltage of the rectifier circuit 23 and outputs a first detection signal SGa when the output voltage of the rectifier circuit 23 exceeds a predetermined threshold voltage (first threshold voltage). The first threshold voltage is set based on the rated voltage of circuit elements constituting the rectifier circuit 23. The second voltage detection circuit 27 monitors the inter-terminal voltage of the second capacitor Cd2 and outputs a second detection signal SGb when the inter-terminal voltage of the capacitor Cd2 falls below a predetermined threshold voltage (second threshold voltage). The second threshold voltage is set based on the rated current of the switching element SW21.

The control circuit 28 outputs a control signal SG1 when both the first and second detection signals are active. As a result, both the switching elements SW21 and SW22 are turned ON to short the input ends P1 and P2 of the rectifier circuit 23 and the output end P4. This allows circuit elements such as the diodes D1 to D4 constituting the rectifier circuit 23 to be protected from overvoltage. Further, the control circuit 28 outputs a power transmission stop signal SG2 when at least the first detection signal is active. The power transmission stop signal SG2 is transmitted wirelessly to the wireless power transmitter 10 side, and the power transmission control circuit 15 of the wireless power transmitter 10 that has received the power transmission stop signal SG2 stops the operation of the switching elements SW11 to SW14, making it possible to prevent the operation of the wireless power transmitter 10 and thus to enhance system safety.

Figure 2A:
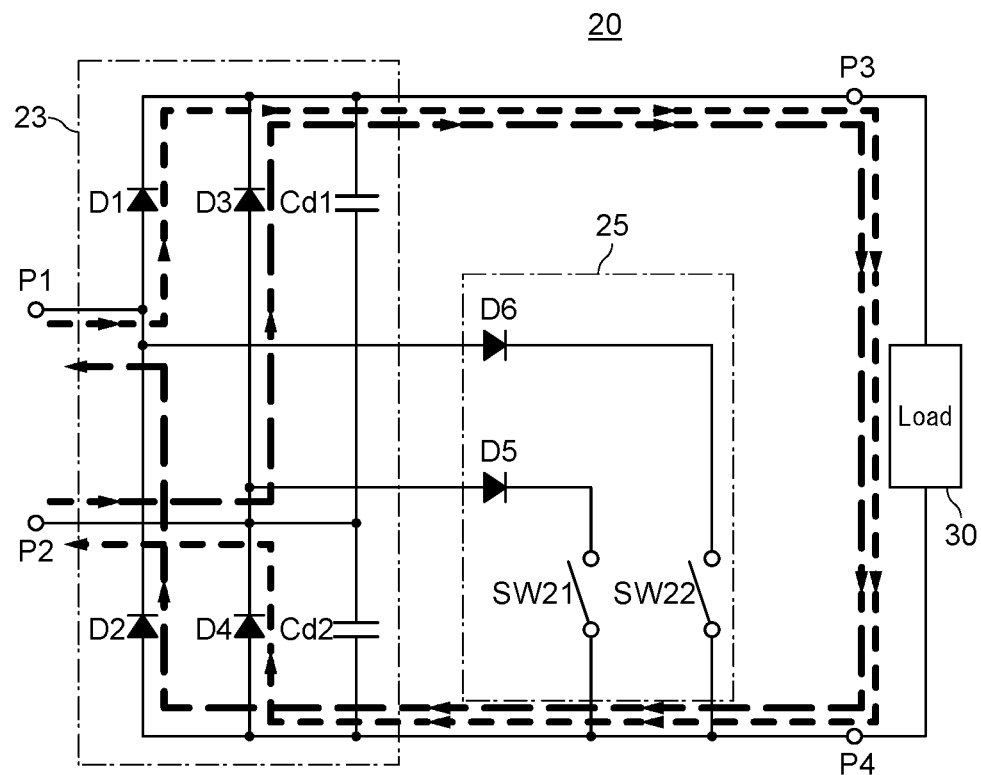
FIGS. 2A and 2B are views for explaining the operation of the protection circuit 25.
Figure 2B:
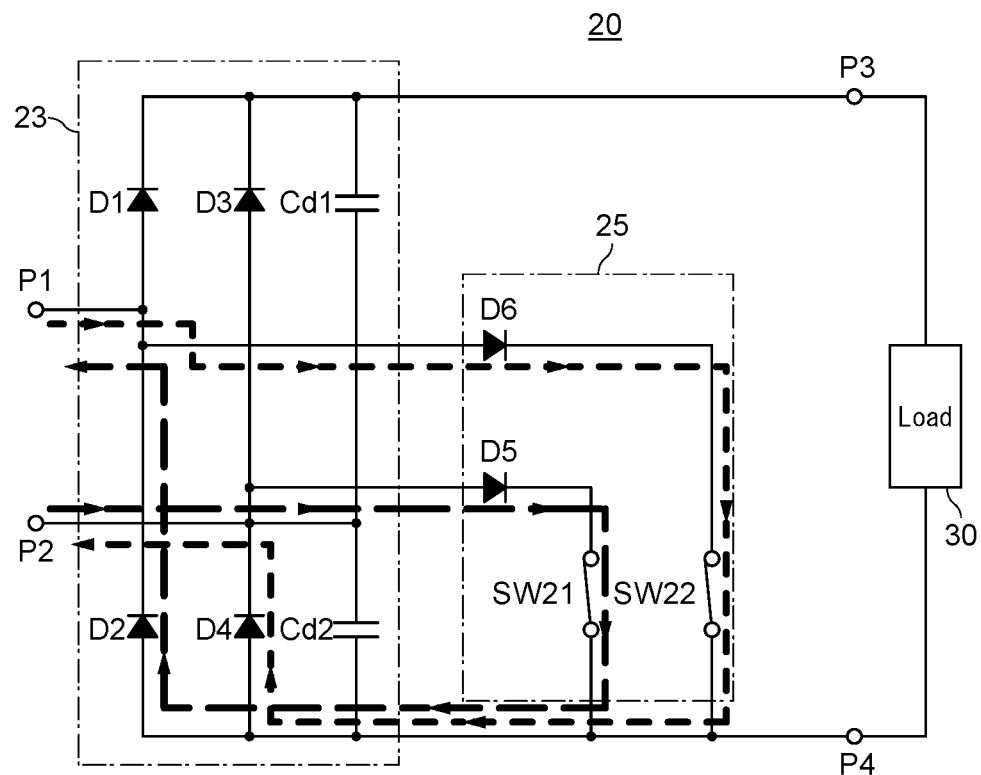
Figure 3A:
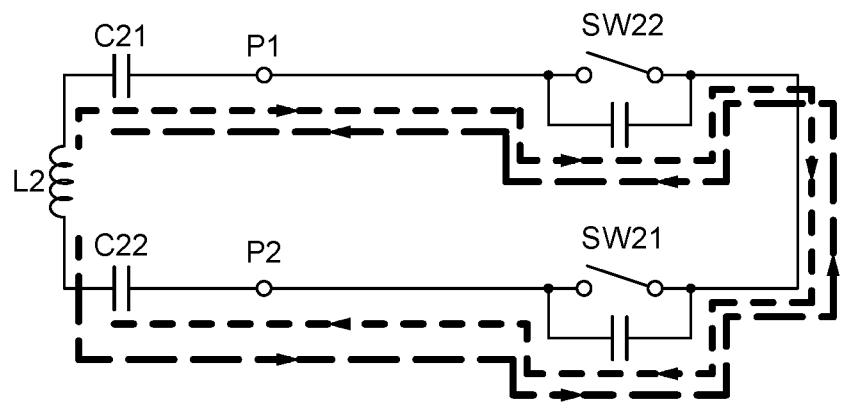
FIGS. 3A and 3B are views for explaining the action of the diodes D5 and D6.
Figure 3B:
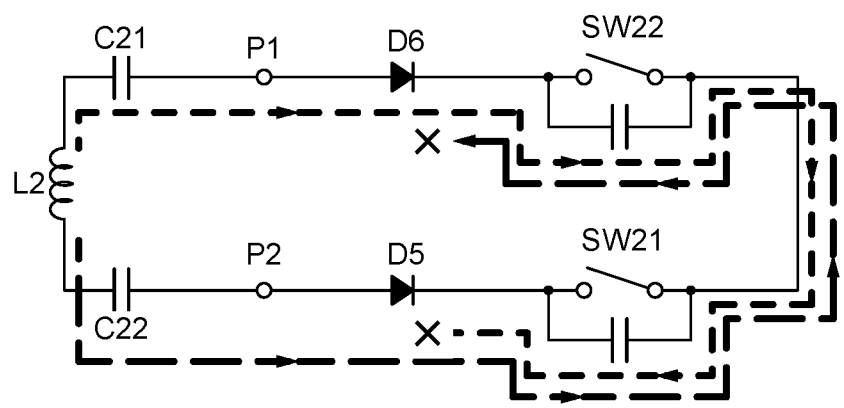

FIGS. 2A and 2B are views for explaining the operation of the protection circuit 25. FIGS. 3A and 3B are views for explaining the action of the diodes D5 and D6.

As illustrated in FIG. 2A, when the switching elements SW21 and SW22 of the protection circuit 25 are turned OFF, the protection circuit 25 can be ignored in terms of current flow. Thus, when the rectifier circuit 23 is operated in a bridge rectifier mode to be described later, one current path from the input end P1 of the rectifier circuit 23 toward the input end P2 serves as a feedback path along which current passes through the diode D1, load 30, and diode D4 sequentially in this order. Further, in this case, the other current path from the input end P2 of the rectifier circuit 23 toward the input end P1 serves as a feedback path along which current passes through the diode D3, load 30, and diode D2 sequentially in this order. At this time, no current flows in the switching elements SW21 and SW22 by the action of the diodes D5 and D6.

As illustrated in FIG. 2B, when the switching elements SW21 and SW22 of the protection circuit 25 are turned ON, the current path formed in the protection circuit 25 is prioritized. Thus, one current path from the input end P1 of the rectifier circuit 23 toward the input end P2 serves as a feedback path along which current passes through the diode D6, switching element SW22, and diode D4 sequentially in this order. Further, in this case, the other current path from the input end P2 of the rectifier circuit 23 toward the input end P1 serves as a feedback path along which current passes through the diode D5, switching element SW21, and diode D2 sequentially in this order. That is, no current flows in the load 30, allowing circuit elements constituting the rectifier circuit 23 and those constituting its downstream circuits to be protected from overvoltage.

As illustrated in FIG. 3A, in a case where the protection circuit 25 is not provided with the diodes D5 and D6 and where parasitic capacitance exists in the switching elements SW21 and SW22, current flows in the parasitic capacitance of the switching elements SW21 and SW22 even when the switching elements SW21 and SW22 are in an OFF state. That is, current supplied from the power reception unit 21 also flows in a path along which current passes not only through the rectifier circuit 23 but also through the switching elements SW21 and SW22 and returns to the power reception unit 21 again, whereby reactive power occurs to deteriorate power factor.

However, as illustrated in FIG. 3B, in a case where the protection circuit 25 is provided with the diodes D5 and D6, the current path passing through the switching elements SW21 and SW22 is completely blocked off even when parasitic capacitance exists in the switching elements SW21 and SW22, which is equivalent to a state where the current path is opened from the perspective of circuitry, and the parasitic capacitance is no longer discharged. Thus, it is possible to suppress occurrence of reactive power due to the parasitic capacitance of the switching elements SW21 and SW22.

The protection circuit 25 is a circuit that shorts the input end of the rectifier circuit 23 and the negative side output end thereof to prevent circuit elements constituting the rectifier circuit 23, etc., from being broken. Specifically, the protection circuit 25 monitors the output voltage of the rectifier circuit 23 and turns ON the switching element SW21 and SW22 when detecting overvoltage to thereby prevent overvoltage. The inter-terminal voltage of the capacitor Cd2 connected in parallel to the switching element SW21 is an AC voltage, and the peak level of the inter-terminal voltage of the capacitor Cd2 becomes very high at overcurrent. When the switching element SW21 is turned ON at the timing when the peak level is so high, excessive current may flow in the switching element SW21 to break the switching element SW21. Thus, in the present embodiment, the ON/OFF control of the switching elements SW21 and SW22 of the protection circuit 25 based on both the output voltage Vo of the rectifier circuit 23 and inter-terminal voltage $v_{C2}$ of the capacitor Cd2.

Figure 4:
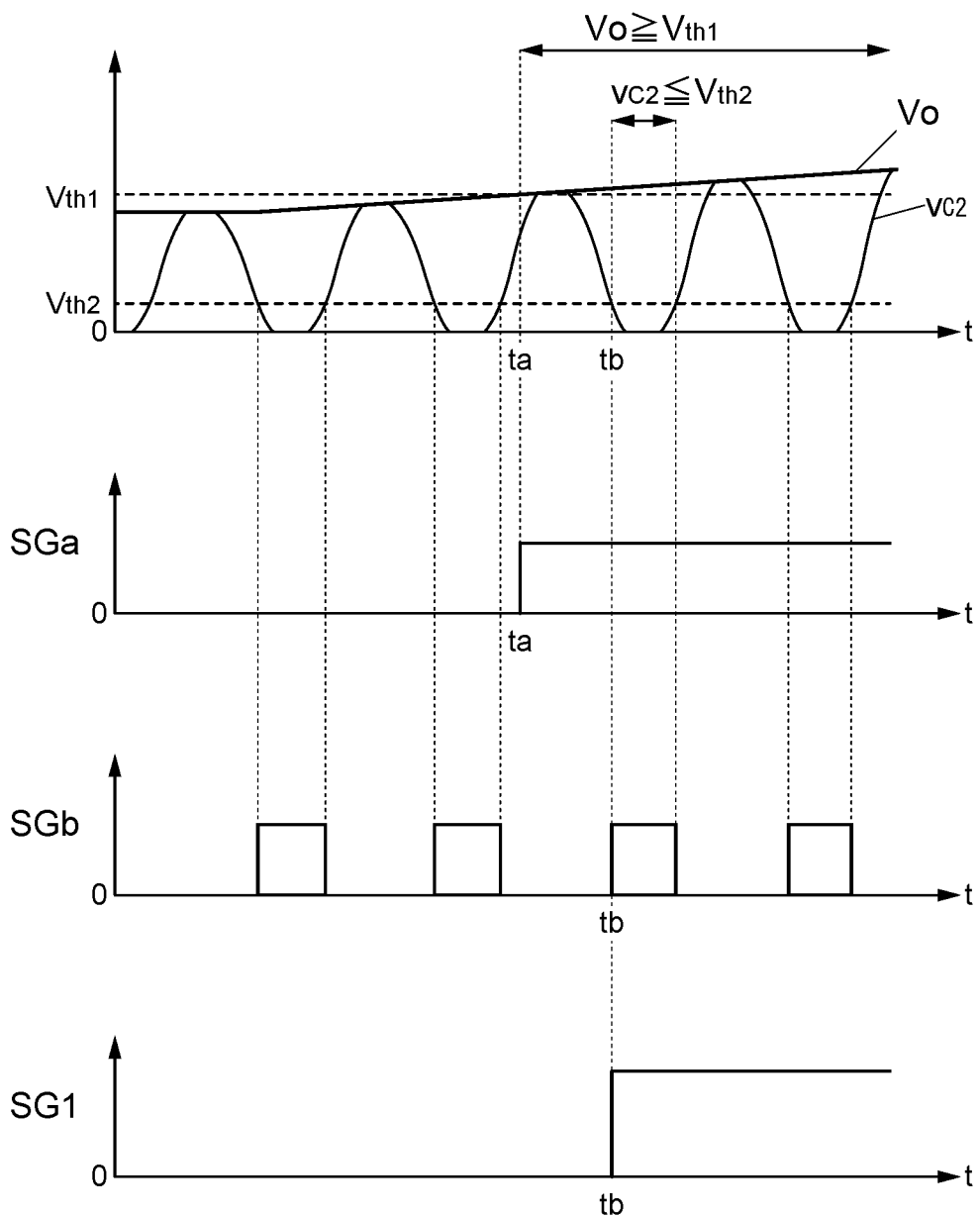
FIG. 4 is a signal waveform diagram illustrating the output voltage Vo of the rectifier circuit 23, the inter-terminal voltage $v_{C2}$ of the second capacitor Cd2, and the control signal SG1 output from the control circuit 28.

FIG. 4 is a signal waveform diagram illustrating the output voltage Vo of the rectifier circuit 23, the inter-terminal voltage $v_{C2}$ of the second capacitor Cd2, and the control signal SG1 output from the control circuit 28.

As illustrated in FIG. 4, the output voltage Vo of the rectifier circuit 23 is substantially a DC voltage, and it is assumed here that the output voltage Vo gradually increases with the lapse of time to advance an overvoltage state. On the other hand, the inter-terminal voltage $v_{C2}$ of the capacitor Cd2 is an AC voltage close to a sine wave, and the amplitude thereof gradually increases like the output voltage Vo of the rectifier circuit 23.

The first voltage detection circuit 26 monitors the output voltage Vo of the rectifier circuit 23 and outputs the first detection signal SGa at a time $t_a$ when the output voltage Vo exceeds the first threshold voltage $V_{th1}$. The second voltage detection circuit 27 monitors the inter-terminal voltage $v_{C2}$ of the capacitor Cd2 and outputs the second detection signal SGb when the inter-terminal voltage $v_{C2}$ falls below a threshold voltage $V_{th2}$.

After the time $t_a$ at which the output voltage Vo of the rectifier circuit 23 exceeds the first threshold voltage $V_{th1}$, it is necessary to activate the protection circuit 25 to stop the supply of overvoltage. However, as illustrated, the inter-terminal voltage $v_{C2}$ of the capacitor Cd2 exceeds the second threshold voltage $V_{th2}$ at the time $t_a$, so that the control signal SG1 is kept at a low level, with the result that the protection circuit 25 is not activated. This makes it possible to suppress excessive current from flowing in the switching element SW22 of the protection circuit 25.

Thereafter, at a time $t_b$ when the inter-terminal voltage $v_{C2}$ of the capacitor Cd2 varies to fall below the second threshold voltage $V_{th2}$, the second detection signal SGb of the second voltage detection circuit 27 becomes a high level, and the control signal SG1 also becomes a high level. As a result, both the switching elements SW21 and SW22 are turned ON, making it possible to prevent overvoltage from being output from the rectifier circuit 23.

In the present embodiment, the switching element SW22 is switched from an OFF state to an ON state at the same timing as the switching element SW21; however, the above switching may be performed at a timing different from that of the switching element SW21. Even though the switching element SW22 is turned ON at the time $t_a$ when the output voltage Vo of the rectifier circuit 23 exceeds the first threshold voltage $V_{th1}$, excessive current flows neither in the switching element SW22 nor in the diode D6, so that it is possible to protect the rectifier circuit 23 at an early stage by turning ON the switching element SW22 before the turn-ON of the switching element SW21.

Next, normal rectifier operation performed by the rectifier circuit 23 will be described. During normal operation wherein the output voltage is not overvoltage, the rectifier circuit 23 is operated in a bridge rectifier mode or in a double-voltage rectifier mode to be described in detail below.

Figure 5A:
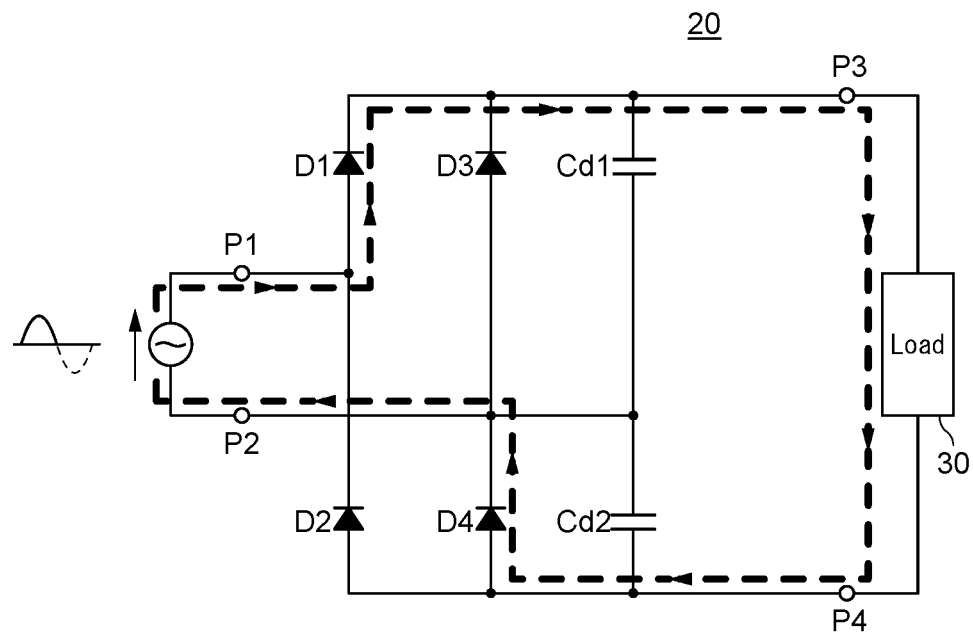
FIGS. 5A and 5B are views for explaining the bridge rectifier mode of the rectifier circuit 23.
Figure 5B:
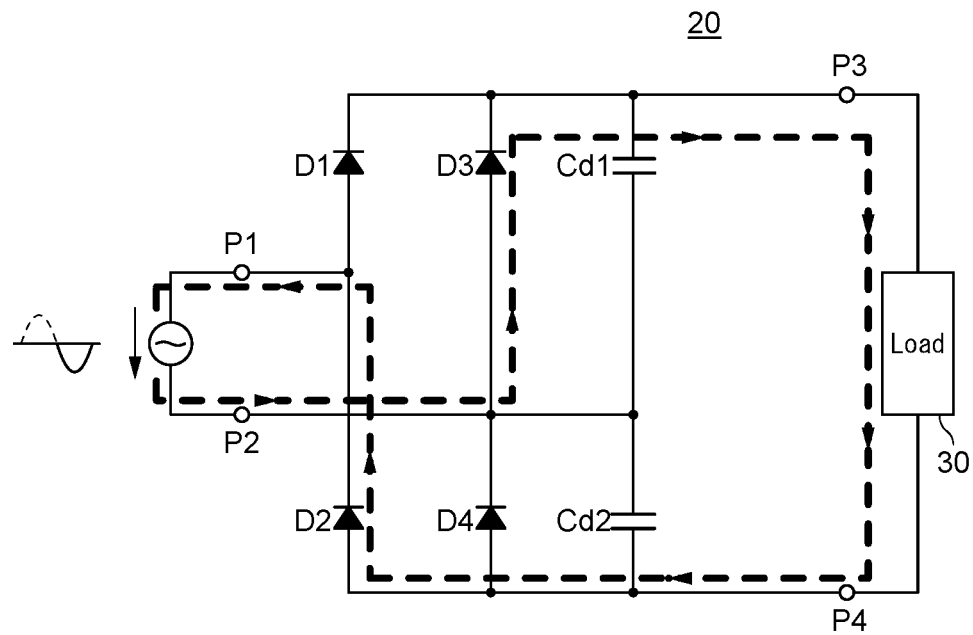
Figure 6A:
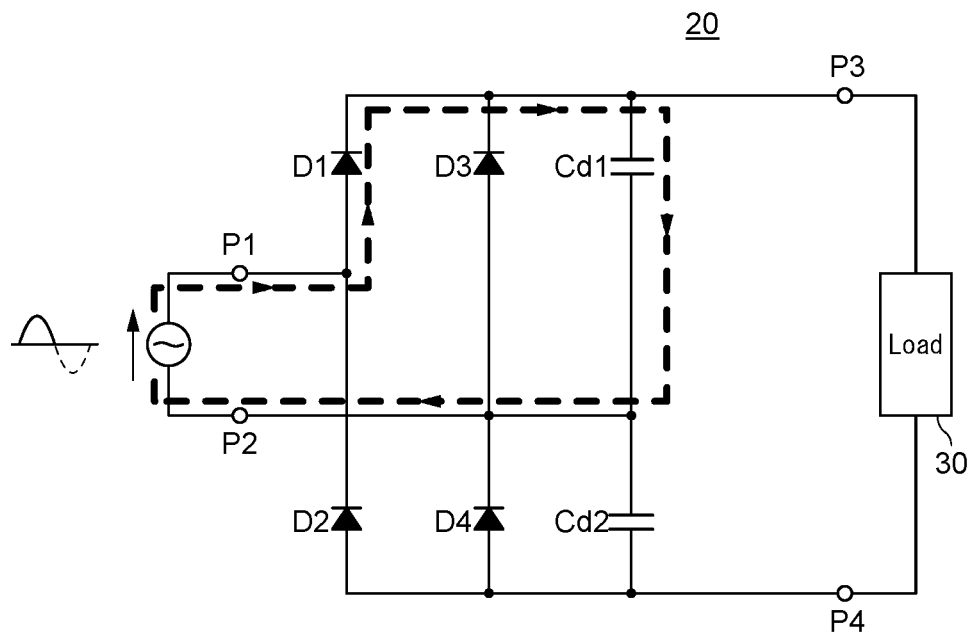
FIGS. 6A and 6B are views for explaining the double-voltage rectifier mode of the rectifier circuit 23.
Figure 6B:
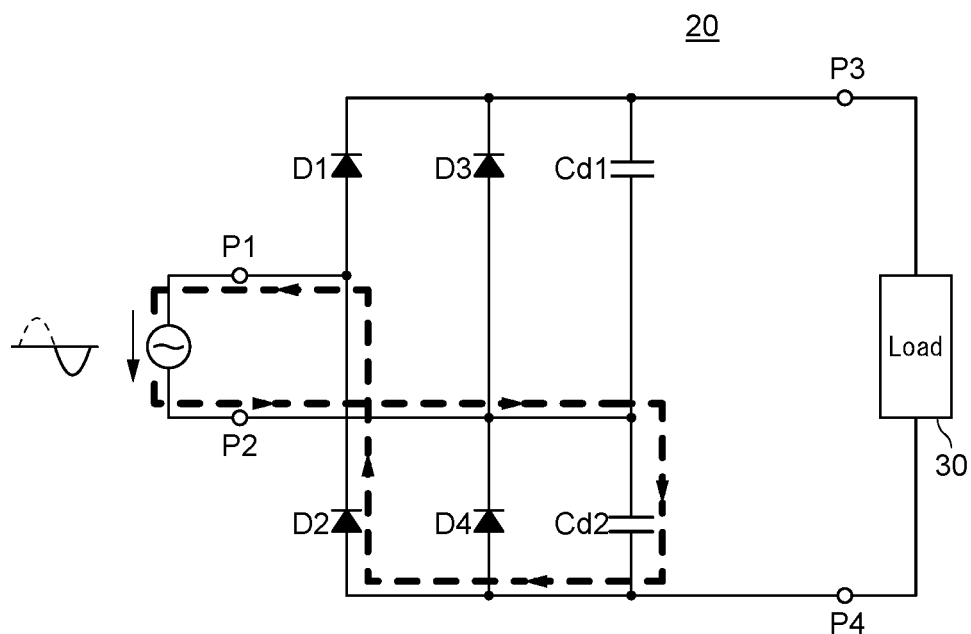

FIGS. 5A, 5B and FIGS. 6A, 6B are views for explaining the operation modes of the rectifier circuit 23. FIGS. 5A and 5B illustrate the bridge rectifier mode, and FIGS. 6A and 6B illustrate the double-voltage rectifier mode.

As illustrated in FIG. 5A, when a voltage is applied with the input end P1 of the rectifier circuit 23 as a positive side and the input end P2 as a negative side, current flows such that, out of the four diodes D1 to D4 constituting the bridge rectifier circuit, the first and fourth diodes D1 and D4 are turned ON, and the second and third diodes D2 and D3 are turned OFF. Conversely, as illustrated in FIG. 5B, when a voltage is applied with the input end P1 of the rectifier circuit 23 as a negative side and the input end P2 as a positive side, current flows such that, the second and third diodes D2 and D3 are turned ON, and the first and fourth diodes D1 and D4 are turned OFF. Thus, the output end P3 of the rectifier circuit 23 becomes a positive terminal, and the output end P4 becomes a negative terminal, and the voltage between the pair of output ends P3 and P4 after rectification becomes a DC voltage having a maximum value $V_{max}$ of the input AC voltage of the rectifier circuit 23.

The first and second capacitors Cd1 and Cd2 constitute a double-voltage rectifier circuit together with the diodes D1 and D2. Further, when the diodes D1 and D2 operate as the bridge rectifier circuit together with the diodes D3 and D4, the first and second capacitors Cd1 and Cd2 act as a harmonic filter element for the bridge rectifier circuit. The electrostatic capacitances of the first and second capacitors Cd1 and Cd2 are preferably the same as each other in order to reduce the ripple of input current to the load 30, although they may not necessarily be the same.

As illustrated in FIG. 6A, when a voltage is applied with the input end P1 of the rectifier circuit 23 as a positive side and the input end P2 as a negative side, current passing through the first diode D1 and first capacitor Cd1 flows, and a DC voltage equivalent to the maximum value $V_{max}$ of the input AC voltage of the rectifier circuit 23 is generated at both ends of the first capacitor Cd1. Conversely, as illustrated in FIG. 6B, when a voltage is applied with the input end P1 as a negative side and the input end P2 as a positive side, current passing through the second diode D2 and second capacitor Cd2 flows, and a DC voltage equivalent to the maximum value $V_{max}$ of the input AC voltage of the rectifier circuit 23 is generated at both ends of the second capacitor Cd2.

Thus, the voltage between the pair of output ends P3 and P4 of the rectifier circuit 23 after rectification becomes a DC voltage about double the maximum value $V_{max}$ of the input AC voltage of the rectifier circuit 23. As described above, the double-voltage rectifier circuit can obtain a DC output voltage about double that of the bridge rectifier circuit even with the same input AC voltage and has an input impedance about half that of the bridge rectifier circuit.

Here, power transmission efficiency at the time of battery charge in a case where only the bridge rectifier circuit is used and that in a case where only the double-voltage rectifier circuit is used will be described with reference to FIG. 7.

Figure 7:
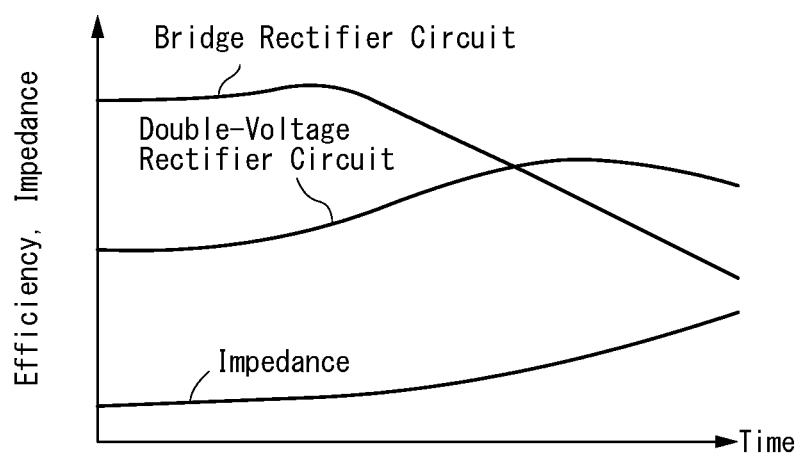
FIG. 7 is a graph illustrating an example of a temporal change in the power transmission efficiency of the bridge rectifier circuit and that of the double-voltage rectifier circuit.

FIG. 7 is a graph illustrating an example of a temporal change in the power transmission efficiency of the bridge rectifier circuit and that of the double-voltage rectifier circuit.

As illustrated in FIG. 7, the impedance of the battery is low in the beginning of charging and gradually increases as the charging progresses. The power transmission efficiency when only the bridge rectifier circuit is used is deteriorated in the latter half of the battery charging period. On the other hand, the power transmission efficiency when only the double-voltage rectifier circuit is used is lower than that when only the bridge rectifier circuit is used in the beginning of the battery charging period and becomes higher in the latter half of the battery charging period.

Thus, in the present embodiment, the bridge rectifier circuit and the double-voltage rectifier circuit are operated such that rectifier action by the bridge rectifier circuit is stronger in the beginning of the battery charging period wherein the impedance is low, and rectifier action by the double-voltage rectifier circuit becomes gradually stronger than that by the bridge rectifier circuit as the charging amount is increased.

The rectifier circuit 23 is operated in the double-voltage rectifier mode at the start of the half cycle of the input AC voltage and is switched from the double-voltage rectifier mode to the bridge rectifier mode in the middle of the half cycle. Then, at the timing of transition to the next half cycle, the rectifier circuit is switched from the bridge rectifier mode to the double-voltage rectifier mode again.

As illustrated in FIGS. 6A and 6B, when the rectifier circuit 23 is operated in the double-voltage rectifier mode, the diodes D3 and D4 are in an OFF state. The switching from the double-voltage rectifier mode to the bridge rectifier mode is made by the ON operation of the diode D3 or diode D4. For example, the inter-terminal voltage of the second capacitor Cd2 of the rectifier circuit 23 (see FIG. 6A) being operated in the double-voltage rectifier mode in the positive half cycle of the input AC voltage applies a reverse bias to the diode D4. Then, the capacitor Cd2 is gradually discharged with the double-voltage rectifier operation, and thus the inter-terminal voltage gradually lowers. Then, after the capacitor Cd2 is completely discharged, the polarity of the inter-terminal voltage of the capacitor Cd2 is reversed to start charging to cause the inter-terminal voltage to apply a forward bias to the diode D4. As a result, the diode D4 is turned ON, whereby the rectifier circuit 23 is switched from the double-voltage rectifier mode to the bridge rectifier mode.

The switching from the bridge rectifier mode to the double-voltage rectifier mode is made at the timing when the polarity of the input AC voltage is reversed. At this time, the inter-terminal voltage of the capacitor Cd2 (or Cd1) applies a reverse bias to the diode D4 (or D3), so that the diode D4 (or D3) is turned OFF, whereby the rectifier circuit 23 is switched to the double-voltage rectifier mode.

The switching from the double-voltage rectifier mode to the bridge rectifier mode is influenced by the magnitude of the electrostatic capacitance of the capacitors Cd1 and Cd2. The larger the capacitance is, the greater the time constant becomes, so that the capacitors Cd1 and Cd2 cannot be completely discharged within the half cycle of the input AC voltage; however, by reducing the capacitance, it is possible to completely discharge the capacitors Cd1 and Cd2 within the half cycle of the input AC voltage and to charge them to a voltage causing the diodes D3 and D4 to be turned ON.

This means that the larger the capacitance of the first and second capacitor Cd1 and Cd2 is, the later the switching timing from the double-voltage rectifier mode to the bridge rectifier mode becomes and, conversely, the smaller the capacitance is, the earlier the switching timing becomes. In other words, when the capacitance of the first and second capacitors Cd1 and Cd2 is large, the operation ratio is higher in the double-voltage rectifier mode and, conversely, when the capacitance of the first and second capacitors Cd1 and Cd2 is small, the operation ratio is higher in the bridge rectifier mode.

Assuming that the frequency of the input AC power is f, and the maximum value of the load impedance of the battery is $R_{Lmax}$, an electrostatic capacitance $C_1$ of the first capacitor Cd1 and an electrostatic capacitance $C_2$ of the second capacitor Cd2 each need to be smaller than $1/(2fR_{Lamx})$ ($C_1$, $C_2 < 1/(2fR_{Lmax})$). By thus setting the electrostatic capacitances, the time ratio of the double-voltage rectifier mode to the bridge rectifier mode can be set to a value smaller than 100% even when the load impedance is maximum, thereby allowing the bridge rectifier circuit to always perform rectifier operation within the variation range of the load impedance.

Further, the electrostatic capacitance $C_1$ of the first capacitor Cd1 and the electrostatic capacitance $C_2$ of the second capacitor Cd2 are each preferably larger than $1/(80 \times 2fR_{Lmax})$ ($C_1$, $C_2 > 1/(80 \times 2fR_{Lmax})$). By thus setting the electrostatic capacitances, the upper limit of the time ratio of the double-voltage rectifier mode of the rectifier circuit 23 to the bridge rectifier mode thereof can be set to a value greater than 10%, thereby allowing the two modes to be operated at an appropriate time ratio within the variation range of the load impedance, which can further enhance suppression effect of a variation in the load impedance.

When the load 30 is a battery, the ratio of the rectifier operation by the bridge rectifier circuit is highest at the charging start time. When the load impedance is gradually increased as charging of the battery progresses, the ratio of the rectifier operation by the bridge rectifier circuit gradually reduces, while the ratio of the rectifier operation by the double-voltage rectifier circuit gradually increases. Then, at the charging completion time wherein the load impedance becomes maximum, the ratio of the rectifier operation by the bridge rectifier circuit becomes lowest, and the rectifier operation by the double-voltage rectifier circuit becomes dominant. Thus, it is possible to suppress a variation in the load impedance as viewed from the input side of the rectifier circuit 23 without separately providing an impedance converter requiring active control.

Figure 8:
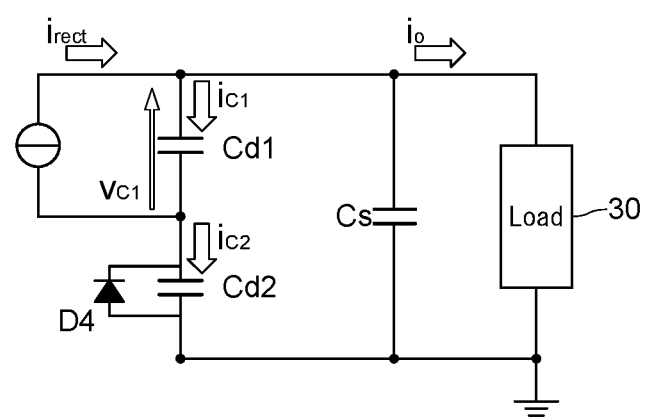
FIG. 8 is an equivalent circuit diagram of the rectifier circuit 23.
Figure 9:
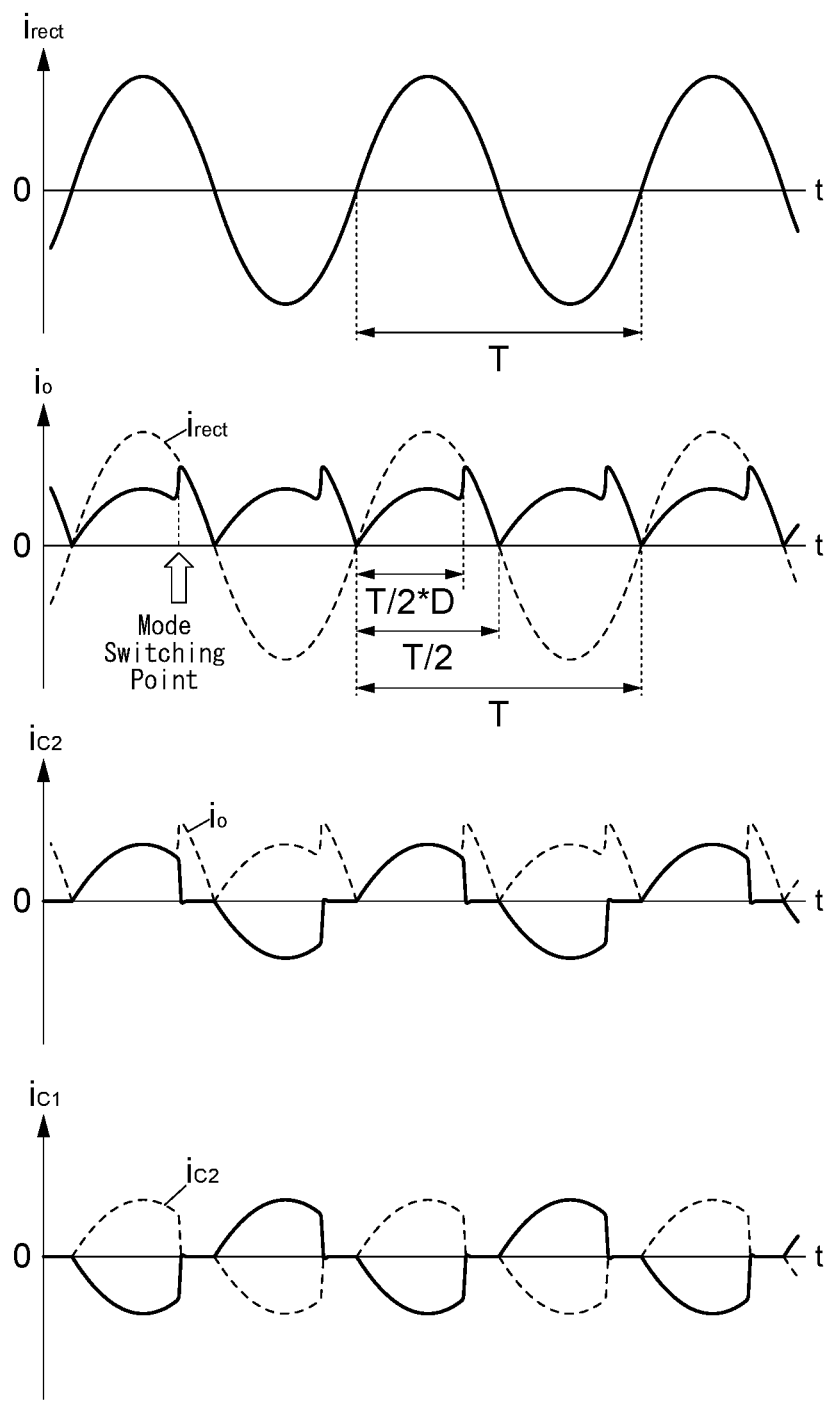
FIG. 9 is a waveform diagram illustrating the input and output currents of the rectifier circuit 23.

FIG. 8 is an equivalent circuit diagram of the rectifier circuit 23. FIG. 9 is a waveform diagram illustrating the input and output currents of the rectifier circuit 23.

As illustrated in FIGS. 8 and 9, when an input current $i_{rect}$ of the rectifier circuit 23 is a sine wave, an output current $i_o$ of the rectifier circuit 23 does not have a normal bridge rectifier waveform but has a waveform that changes discontinuously.

When the output current $i_o$ of the rectifier circuit 23 is made to overlap the input current $i_{rect}$ and a current $-i_{C2}$ flowing in the second capacitor Cd2, it can be seen that the output current $i_o$ always coincides with one of the two currents, and that the mode is switched on the way. That is, the output current $i_o$ coincides with the current $-i_{C2}$ before the mode switching point and coincides with the input current $i_{rect}$ after the mode switching point. Further, a current $i_{C1}$ flowing in the first capacitor Cd1 and the current $i_{C2}$ flowing in the second capacitor Cd2 have the same magnitude and reverse signs ($i_{C1}=-i_{C2}$). Thus, it can be seen that the rectifier circuit 23 is operated in the double-voltage rectifier mode in the first half of the half cycle with a mode switching point as a boundary and operated in the bridge rectifier mode in the latter half of the half cycle. When the currents of FIG. 9 are defined by the arrows of FIG. 8, the relationship among the input currents $i_{rect}$, current $i_{C1}$, and current $i_{C2}$ is represented by $i_{rect}=i_{C1}-i_{C2}=2i_{C1}$.

Figure 10A:
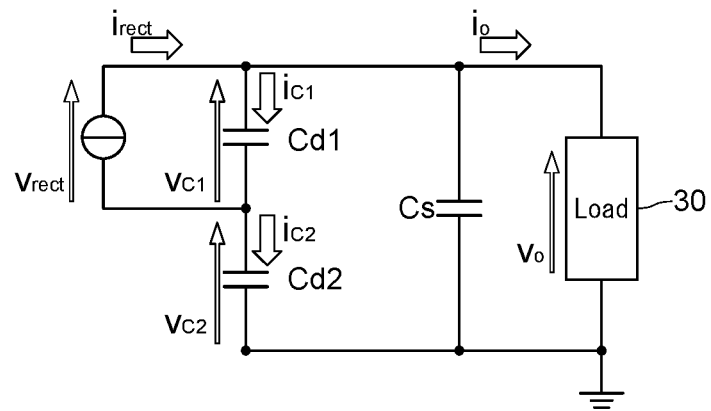
FIG. 10A is an equivalent circuit in the bridge rectifier mode.
Figure 10B:
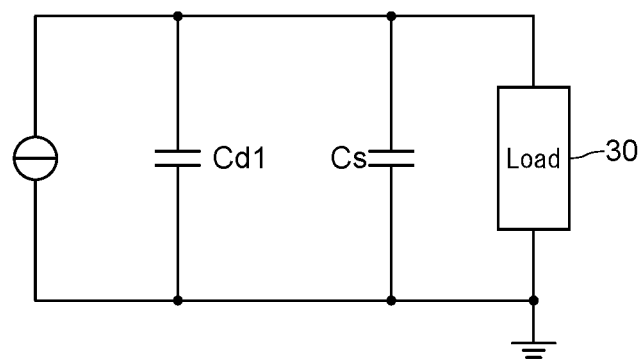
FIG. 10B is an equivalent circuit in the double-voltage rectifier mode.

The switching between the two modes is caused by the ON operation of the diode D4 connected in parallel to the second capacitor Cd2. That is, when the fourth diode D4 is in an OFF state, the rectifier circuit 23 is operated in the double-voltage rectifier mode, and the equivalent circuit of the double-voltage rectifier circuit becomes like that illustrated in FIG. 10A. When the diode D4 is in an ON state, the rectifier circuit 23 is operated in the bridge rectifier mode, and the equivalent circuit of the bridge rectifier circuit becomes like that illustrated in FIG. 10B.

Figure 11:
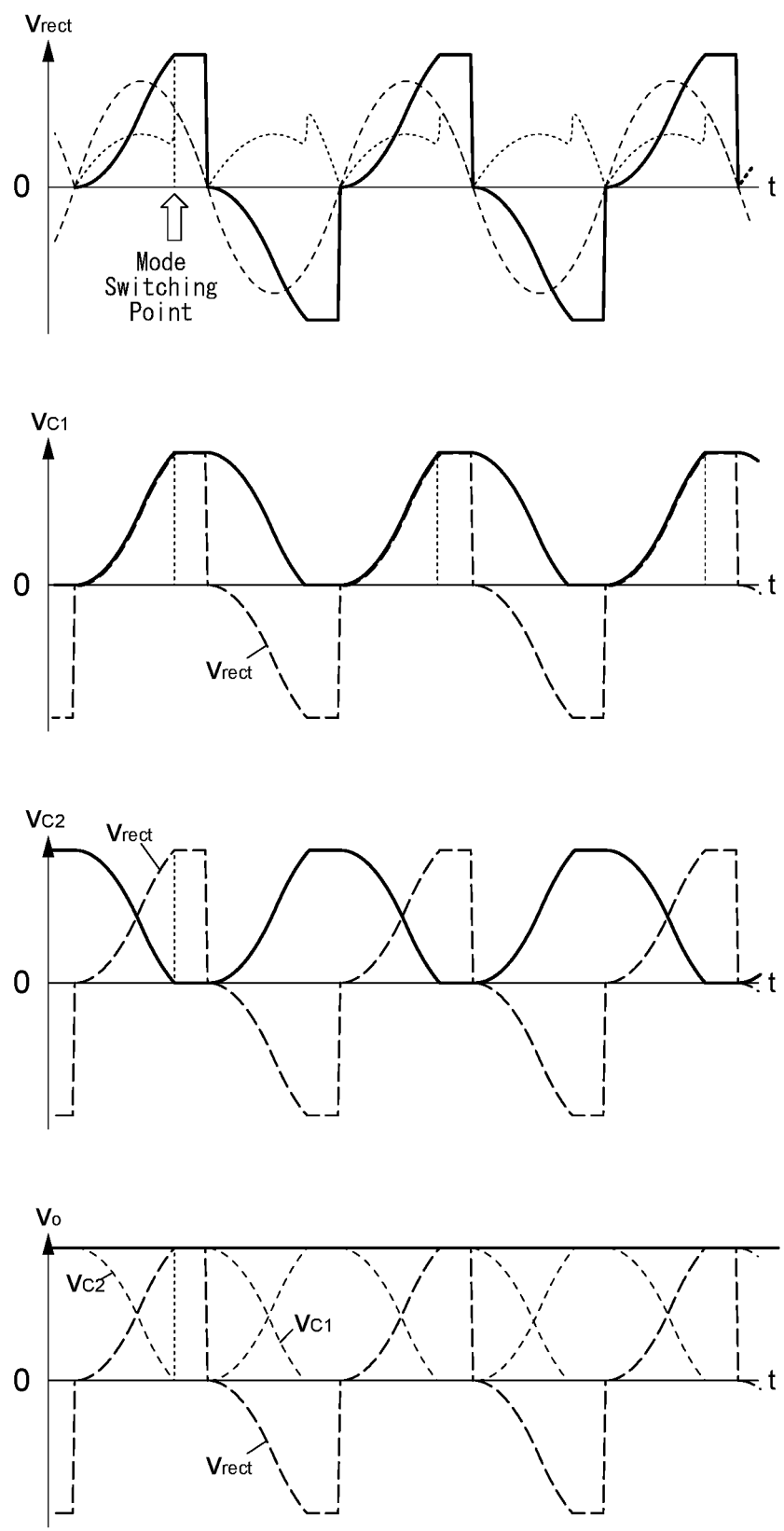
FIG. 11 is a waveform diagram illustrating the input voltage $v_{rect}$ of the rectifier circuit 23.

An input voltage $v_{rect}$ corresponding to the sine wave input current $i_{rect}$ of the rectifier circuit 23 has a distorted waveform as illustrated in FIG. 11. Assuming that the inter-terminal voltages of the first and second capacitors Cd1 and Cd2 are $v_{C1}$ and $v_{C2}$, respectively, the input voltage $v_{rect}$ is $v_{C1}$ or $v_{C2}$ as the positive or negative half wave, and when the voltages of FIG. 11 are defined by the arrows of FIG. 10A, the relationship among an output voltage $V_o$ and inter-terminal voltages $v_{C1}$ and $v_{C2}$ of the capacitors Cd1 and Cd2 is represented by $v_{C1}+v_{C2}=V_o$ (constant).

The switching point between the two modes is a point at which the inter-terminal voltage of one of the two capacitors constituting the rectifier circuit 23 becomes zero. At this time, the inter-terminal voltage of the other capacitor is equal to the output voltage $V_o$ (DC voltage). That is, $v_{C1}$ (t=0)=0, $v_{C1}$ (t=$t_d$)=$V_o$ is satisfied ($t_d$: switching time).

FIG. 12 is a view for explaining a difference in the position of a mode switching point D.

Figure 12A:
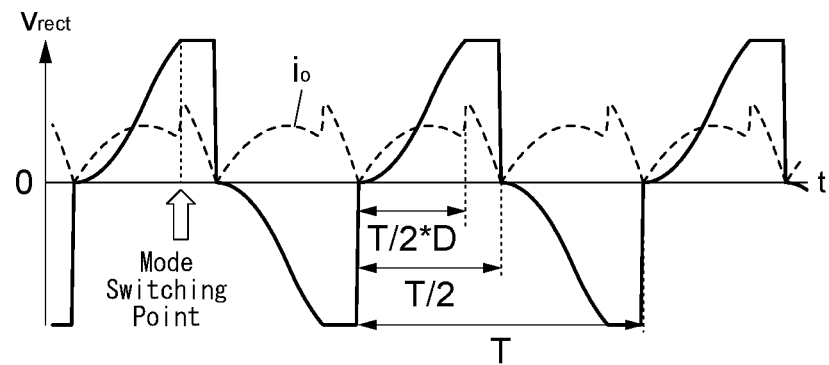
FIG. 12A is a waveform diagram illustrating the input voltage $v_{rect}$ in the position of a mode switching point when the mode switching timing is late (D is large)
Figure 12B:
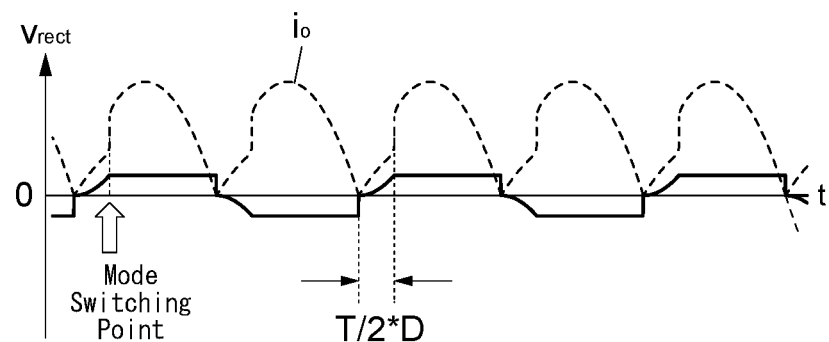
FIG. 12B is a waveform diagram illustrating the input voltage $v_{rect}$ in the position of a mode switching point when the mode switching timing is early (D is small)

As illustrated in FIG. 12A, when the mode switching timing is late (D is large), influence of the double-voltage rectifier operation becomes larger, with the result that the input voltage $v_{rect}$ becomes high. On the other hand, as illustrated in FIG. 12B, when the mode switching timing is early (D is small), influence of the bridge rectifier operation becomes larger, with the result that the input voltage $v_{rect}$ becomes low even when the magnitude of the input current $i_{rect}$ is the same. This means that the later the mode switching timing is, the smaller the input impedance becomes due to influence of the double-voltage rectifier mode and, conversely, means that the earlier the mode switching timing is, the larger the influence of the bridge rectifier mode becomes, with the result that the input impedance is not reduced.

Next, the derivation of the mode switching point D will be described.

When the mode switching point in the half cycle from t=0 to t=T/2 is represented by D: [0, 1], it is represented by TD/2 [μs] in terms of the time of the switching point [μs].

The mode switching point D is calculated from the following conditional expressions.

$$i_{C2}=i_{C1}$$

$$i_{rect}=i_{C1}-i_{C2}=2_{iC1}$$

$$v_{C1}+v_{C2}=V_o (\text{constant})$$

$$v_{C1}(t=0)=0, v_{C1}(t=TD/2)=V_o$$

Then, the $v_{C1}$ is calculated as follows.

$$v_{c1}(t) = \frac{1}{C_d}\int i_{c1}(t)dt = \frac{|i_{rect}|}{2C_d}\int \sin\omega t\, dt = -\frac{|i_{rect}|}{2\omega C_d}\int \cos\omega t + C \quad [\text{numeral 1}]$$

from the initial conditions, $$v_{c1}(0) = -\frac{|i_{rect}|}{2\omega C_d} + C = 0 \quad \therefore C = \frac{|i_{rect}|}{2\omega C_d}$$

$$\therefore v_{c1}(t) = \frac{|i_{rect}|}{2\omega C_d}(1-\cos\omega t)$$

from the final value conditions, $$v_{c1}\left(\frac{T}{2}D\right) = \frac{|i_{rect}|}{2\omega C_d}(1-\cos\omega t) = V_o - R_L I_o \quad \because \omega = \frac{2\pi}{T}$$

Then, $I_o$ (average value (DC value) of $i_o$) is calculated as follows.

$$I_o = \frac{1}{T/2}\left(\int_0^{\frac{T}{2}D} i_{c1}(t)dt + \int_{\frac{T}{2}D}^{\frac{T}{2}} i_{rect}(t)dt\right) \quad [\text{numeral 2}]$$

$$= \frac{2}{T}|i_{rect}|\left(\frac{1}{2}\int_0^{\frac{T}{2}D} \sin\omega t\, dt + \int_{\frac{T}{2}D}^{\frac{T}{2}} \sin\omega t\, dt\right)$$

$$= \frac{2}{T}|i_{rect}|\frac{1}{\omega}\left(-\frac{1}{2}[\cos\omega t]_0^{\frac{T}{2}D} - [\cos\omega t]_{\frac{T}{2}D}^{\frac{T}{2}}\right)$$

$$= \frac{|i_{rect}|}{\omega}\left(\frac{1}{2}\cos\pi D - \frac{3}{2}\right)$$

$$\therefore I_o = \frac{|i_{rect}|}{2\pi}(\cos\pi D + 3)$$

Then, simultaneous equations of $v_{C1}$ and $I_o$ are set up as follows.

$$\frac{|i_{rect}|}{2\omega C_d}(1-\cos\pi D) = R_L\frac{|i_{rect}|}{2\pi}(\cos\pi D + 3) \quad [\text{numeral 3}]$$

$$\left(\frac{\pi}{\omega C_d R_L}+1\right)\cos\pi D = \frac{\pi}{\omega C_d R_L}-3$$

$$\therefore D = \frac{1}{\pi}\cos^{-1}\left(\frac{\frac{\pi}{\omega C_d R_L} - 3}{\frac{\pi}{\omega C_d R_L} + 1}\right)$$

Since a domain in parentheses of expression (numeral 3) is [−1, 1], it can be seen that $\pi/(\omega C_d R_L) > 1$ and $R_L < \pi/(\omega C_d)$ need to be satisfied. This defines the range of a load impedance $R_L$ to which the present calculation can be applied.

In order to satisfy D<1 when the load impedance $R_L$ is maximum ($R_L = R_{Lmax}$) as described above, $R_{Lmax} < \pi/(\omega C_d)$ needs to be satisfied. In other words, $R_{Lmax} < 1/(2fC_d)$ needs to be satisfied, and the electrostatic capacitances $C_1$ and $C_2$ of the first and second capacitors Cd1 and Cd2 need to be smaller than $1/(2fR_{Lmax})$. From the above calculations, it can be seen that it is necessary to satisfy $C_1, C_2 < 1/(2fR_{Lmax})$ in order to satisfy D<1 when the load impedance $R_L$ is maximum ($R_L = R_{Lmax}$).

Figure 13:
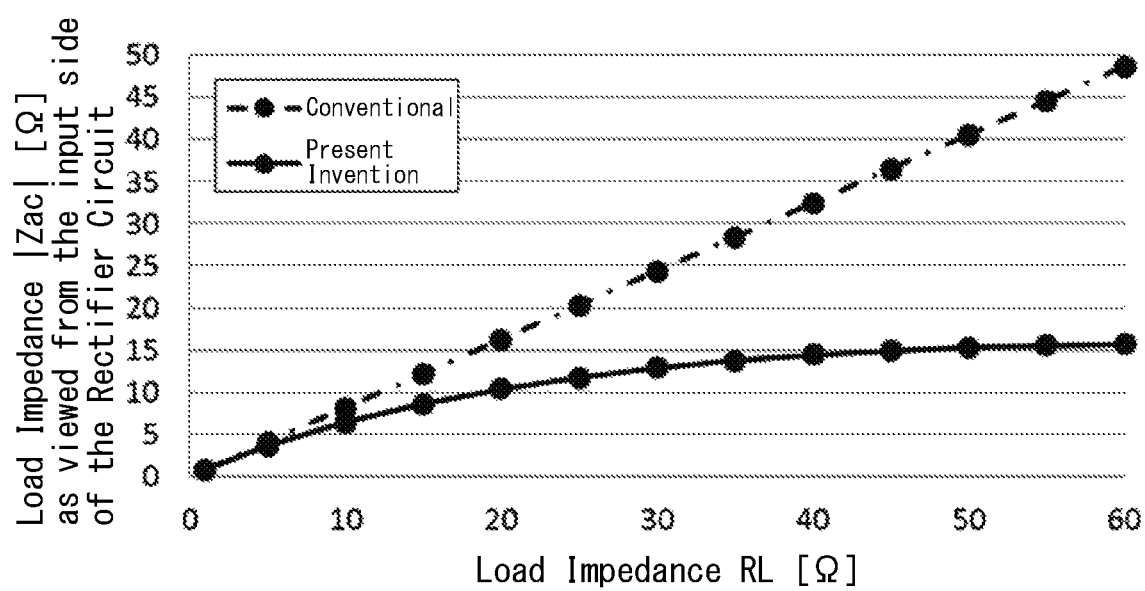
FIG. 13 is a graph illustrating the relationship between a load impedance $|Z_{ac}|$ as viewed from the input side of the rectifier circuit 23 and actual load impedance $R_L$.

FIG. 13 is a graph illustrating the relationship between a load impedance $|Z_{ac}|$ as viewed from the input side of the rectifier circuit 23 and actual load impedance $R_L$.

As illustrated in FIG. 13, in a conventional bridge rectifier circuit, the load impedance as viewed from the input side of the rectifier circuit 23 varies in proportion to the actual load impedance $R_L$. That is, when the actual load impedance $R_L$ increases, e.g., from about 0Ω to about 60Ω, the load impedance $|Z_{ac}|$ as viewed from the input side of the rectifier circuit 23 increases from about 0Ω to about 50Ω.

On the other hand, in the rectifier circuit 23 according to the present invention, the load impedance $|Z_{ac}|$ as viewed from the input side of the rectifier circuit 23 varies smaller than the actual impedance $R_L$. That is, even when the actual impedance $R_L$ varies from about 0Ω to about 60Ω, the load impedance $|Z_{ac}|$ as viewed from the input side of the rectifier circuit 23 increases only from about 0Ω to about 15Ω. This means that a variation in the load impedance on the wireless power receiver 20 side as viewed from the wireless power transmitter 10 is suppressed by the rectifier circuit 23. Thus, it is possible to suppress deterioration in power transmission efficiency due to impedance mismatch between the wireless power transmitter 10 side and the wireless power receiver 20 side.

As described above, the wireless power transmission system 1 according to the present embodiment has the wireless power transmitter 10 that wirelessly supplies power and the wireless power receiver 20 that receives the power wirelessly supplied from the wireless power transmitter 10. The wireless power receiver 20 has the rectifier circuit 23 including the diodes D1 to D4 and capacitors Cd1 and Cd2 and the protection circuit 25 including the switching element SW21. The ON/OFF operation of the switching element SW21 is controlled based not only on the output voltage of the rectifier circuit 23 but also on the inter-terminal voltage of the capacitor Cd2 of the rectifier circuit 23, thereby making it possible to suppress excessive current from flowing in the switching element SW21 constituting the protection circuit 25. Further, both ends of the power reception unit are short-circuited when overvoltage occurs in the output end of the power reception unit, thereby making it possible to protect its downstream circuits from overvoltage. Thus, upon the occurrence of overvoltage, it is possible to protect circuit elements constituting the protection circuit itself while protecting circuit elements constituting the device.

Further, the wireless power receiver 20 according to the present embodiment has the rectifier circuit 23 that converts AC power received by the power reception coil L2 into DC power and outputs the DC power to the load 30. The rectifier circuit 23 has the bridge-connected diodes D1 to D4, the first capacitor Cd1 connected in parallel to the diode D3 whose anode is connected to the input end P2 of the rectifier circuit 23, and the second capacitor Cd2 connected in parallel to the diode D4 whose cathode is connected to the input end P2 of the rectifier circuit 23, thereby allowing the rectifier circuit 23 to be operated as the bridge rectifier circuit or double-voltage rectifier circuit. In addition, the time ratio between the bridge rectifier mode and the double-voltage rectifier mode of the rectifier circuit 23 can be passively changed in accordance with a variation in the impedance of the load 30 connected to the output of the rectifier circuit 23. Thus, it is possible to suppress a variation in the impedance of the load 30 as viewed from the input side of the rectifier circuit 23 without separately providing an impedance converter requiring active control to thereby suppress deterioration in power transmission efficiency due to a variation in the load impedance.

Further, in the wireless power receiver 20, assuming that the electrostatic capacitance of the first capacitor Cd1 is $C_1$, the electrostatic capacitance of the second capacitor Cd2 is $C_2$, the frequency of the AC power is f, and the maximum resistance value of the load 30 is $R_{Lmax}$, the electrostatic capacitance $C_1$ of the first capacitor Cd1 and the electrostatic capacitance $C_2$ of the second capacitor Cd2 are each smaller than $1/(2fR_{Lmax})$, so that the upper limit of the time ratio of the double-voltage rectifier mode of the rectifier circuit 23 to the bridge rectifier mode thereof within the half cycle of the AC power input to the rectifier circuit 23 can be set to a value smaller than 100%, thereby allowing the two modes to be operated at an appropriate time ratio within the variation range of the impedance of the load 30, whereby a variation in the load impedance can be suppressed.

Figure 14:
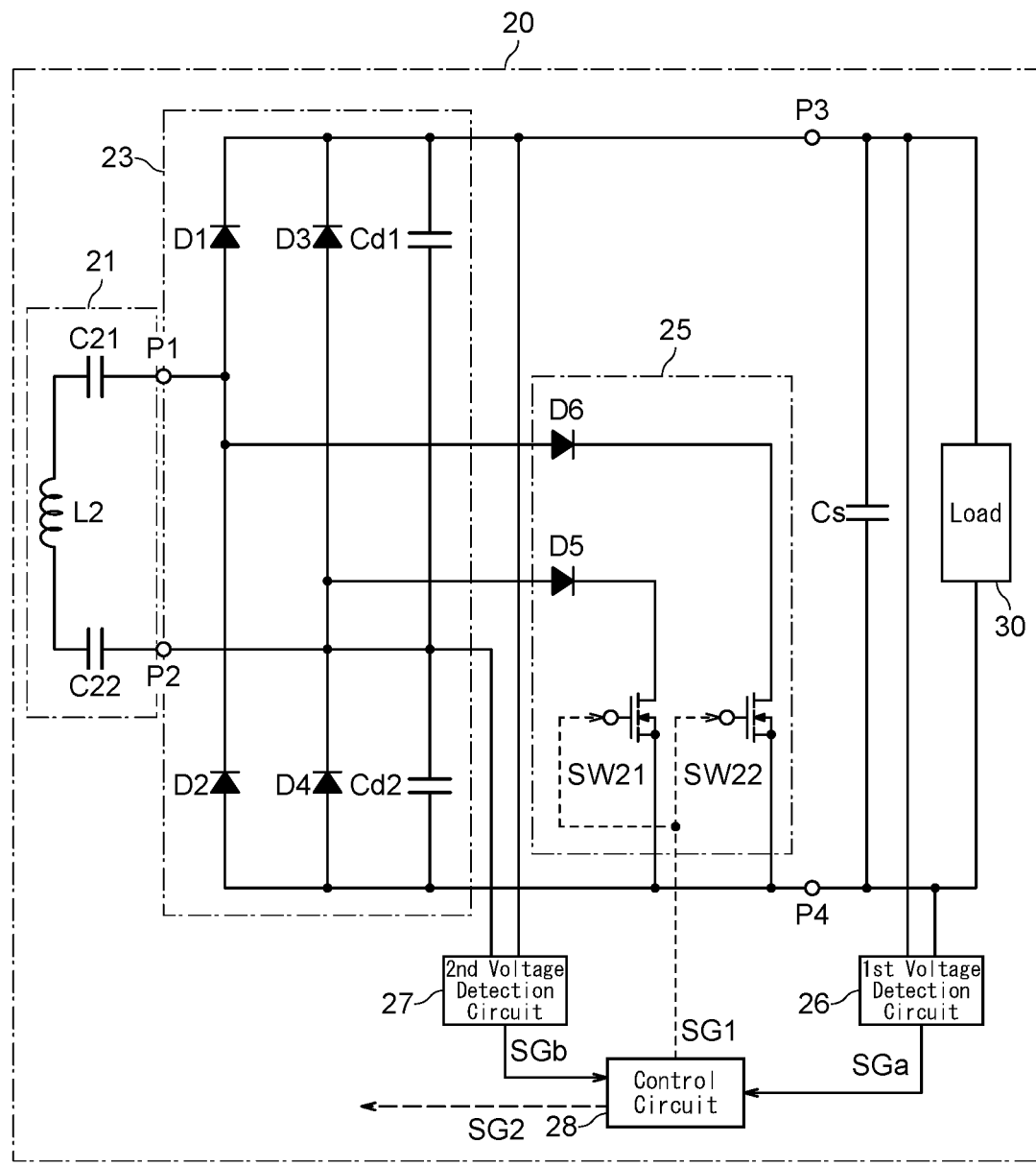
FIG. 14 is a circuit diagram illustrating the configuration of a wireless power receiver according to a second embodiment.

FIG. 14 is a circuit diagram illustrating the configuration of a wireless power receiver according to a second embodiment.

As illustrated in FIG. 14, a wireless power receiver 20 according to the present embodiment is featured in that the second voltage detection circuit 27 detects the inter-terminal voltage of the first capacitor Cd1. That is, the control circuit 28 outputs the control signal SG1 to activate the protection circuit 25 when the following two conditions are met: the output voltage of the rectifier circuit 23 exceeds the first threshold voltage; and the inter-terminal voltage of the capacitor Cd1 exceeds a third threshold voltage. The inter-terminal voltage $v_{C1}$ of the first capacitor Cd1 is an AC voltage having a reverse phase to the inter-terminal voltage $v_{C2}$ of the second capacitor Cd2, so that it is possible to indirectly detect the inter-terminal voltage $v_{C2}$ of the second capacitor Cd2 from the inter-terminal voltage $v_{C1}$ of the first capacitor Cd1. The third threshold voltage is set based on the rated current of the switching element SW21.

Figure 15:
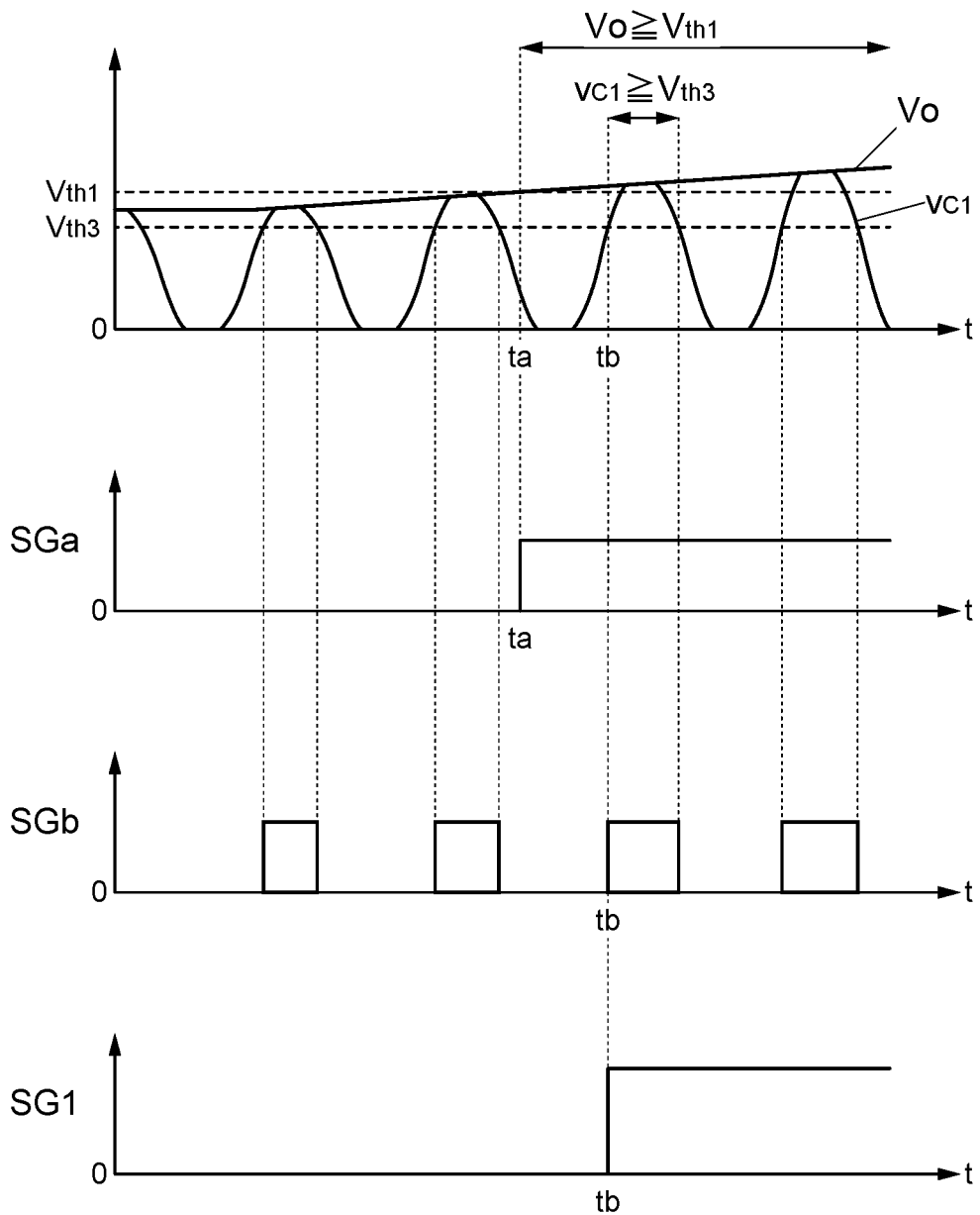
FIG. 15 is a signal waveform diagram illustrating the output voltage Vo of the rectifier circuit 23, the inter-terminal voltage $v_{C1}$ of the first capacitor Cd1, and the control signal SG1 output from the control circuit 28.

FIG. 15 is a signal waveform diagram illustrating the output voltage Vo of the rectifier circuit 23, the inter-terminal voltage $v_{C1}$ of the first capacitor Cd1, and the control signal SG1 output from the control circuit 28.

As illustrated in FIG. 15, the output voltage Vo of the rectifier circuit 23 is substantially a DC voltage, and it is assumed here that the output voltage Vo gradually increases with the lapse of time to advance an overvoltage state. On the other hand, the inter-terminal voltage $v_{C1}$ of the capacitor Cd1 is an AC voltage close to a sine wave, and the amplitude thereof gradually increases like the output voltage Vo of the rectifier circuit 23.

The first voltage detection circuit 26 monitors the output voltage Vo of the rectifier circuit 23 and outputs the first detection signal SGa at a time to when the output voltage Vo exceeds the first threshold voltage $V_{th1}$. The second voltage detection circuit 27 monitors the inter-terminal voltage $v_{C1}$ of the capacitor Cd1 and outputs the second detection signal SGb when the inter-terminal voltage $v_{C1}$ exceeds a threshold voltage $V_{th3}$.

After the time $t_a$ at which the output voltage Vo of the rectifier circuit 23 exceeds the first threshold voltage $V_{th1}$, it is necessary to activate the protection circuit 25 to stop the supply of overvoltage. However, as illustrated, the inter-terminal voltage $v_{C1}$ of the capacitor Cd1 falls below the third threshold voltage $V_{th3}$ at the time $t_a$, so that the control signal SG1 is kept at a low level, with the result that the protection circuit is not activated. A state where the inter-terminal voltage $v_{C1}$ of the capacitor Cd1 falls below the third threshold voltage $V_{th3}$ means that the inter-terminal voltage $v_{C2}$ of the capacitor Cd2 is high. Thus, the protection circuit 25 is not activated at this timing.

Thereafter, at a time $t_b$ when the inter-terminal voltage $v_{C1}$ of the capacitor Cd1 varies to exceed the third threshold voltage $V_{th3}$, the second detection signal SGb of the second voltage detection circuit 27 becomes a high level, and the control signal SG1 also becomes a high level. As a result, both the switching elements SW21 and SW22 are turned ON, making it possible to prevent overvoltage from being output from the rectifier circuit 23.

In the present embodiment, the second voltage detection circuit 27 detects only the inter-terminal voltage $v_{C1}$ of the first capacitor Cd1, and the control circuit 28 controls the ON/OFF operation of the switching elements SW21 and SW22 based on the output voltage Vo of the rectifier circuit 23 and the inter-terminal voltage $v_{C1}$ of the first capacitor Cd1. Alternatively, however, the second voltage detection circuit 27 may detect both the inter-terminal voltages $v_{C1}$ and $v_{C2}$ of the first and second capacitors Cd1 and Cd2, and the control circuit 28 may control the ON/OFF operation of the switching elements SW1 and SW2 using the output voltage Vo of the rectifier circuit 23 and the inter-terminal voltages $v_{C1}$ and $v_{C2}$ of the first and second capacitors Cd1 and Cd2.

Figure 16:
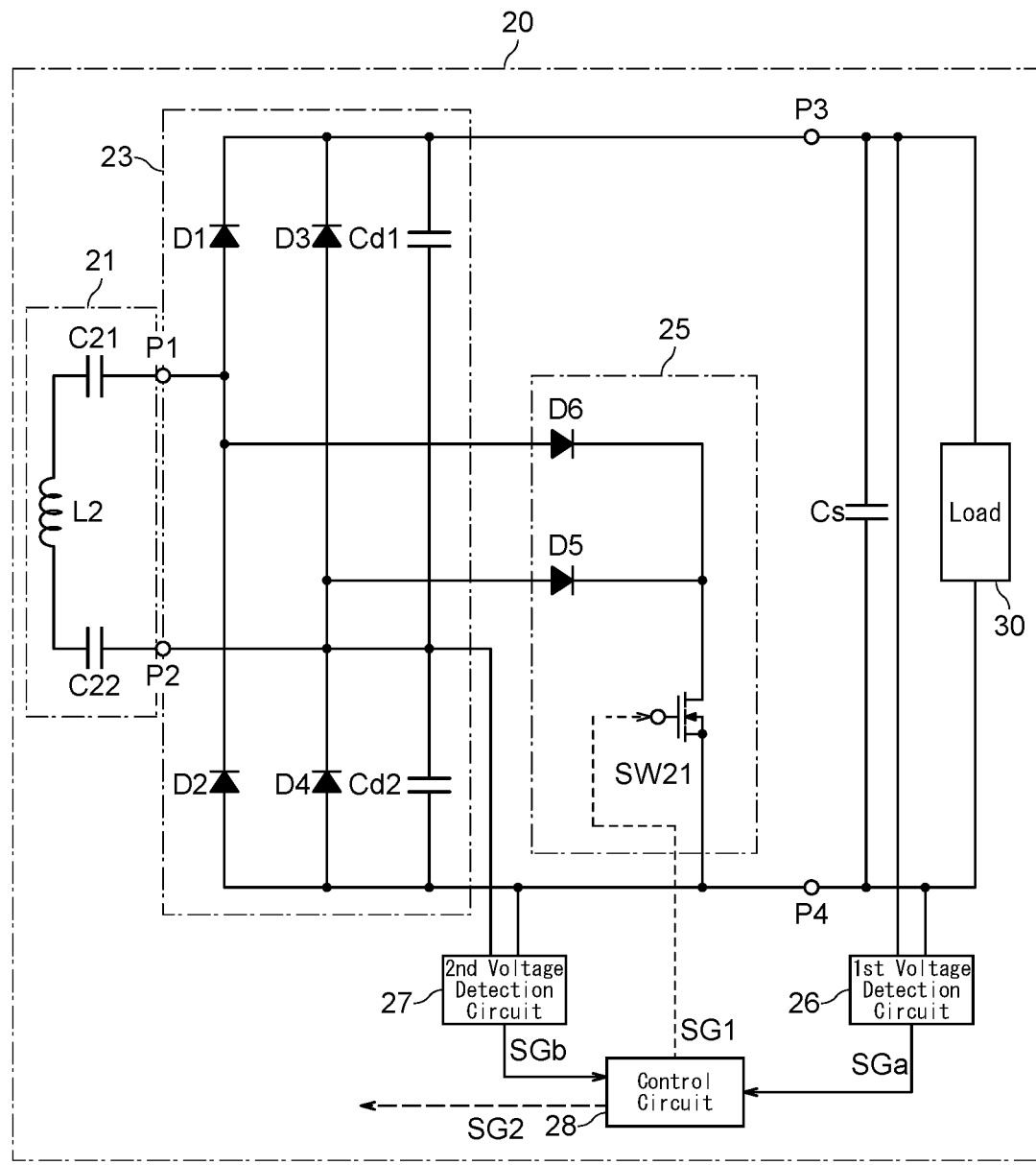
FIG. 16 is a circuit diagram illustrating the configuration of a wireless power receiver according to a third embodiment.

FIG. 16 is a circuit diagram illustrating the configuration of a wireless power receiver according to a third embodiment.

As illustrated in FIG. 16, a wireless power receiver 20 according to the present embodiment is featured in that the protection circuit 25 uses a single switching element SW21. The protection circuit 25 has the switching element SW21 and two diodes D5 and D6. One end of the switching element SW21 is connected to the input end P2 of the rectifier circuit 23 through the diode D5 and to the input end P1 of the rectifier circuit 23 through the diode D6. The other end of the switching element SW21 is connected to the output end P4 of the rectifier circuit 23. Other configurations are the same as those of the first embodiment.

The wireless power receiver 20 according to the present embodiment can produce the same effects as those obtained in the first embodiment. Further, since the protection circuit 25 is constituted by using the single switching element SW21, cost reduction and stabilization of control can be achieved.

Figure 17:
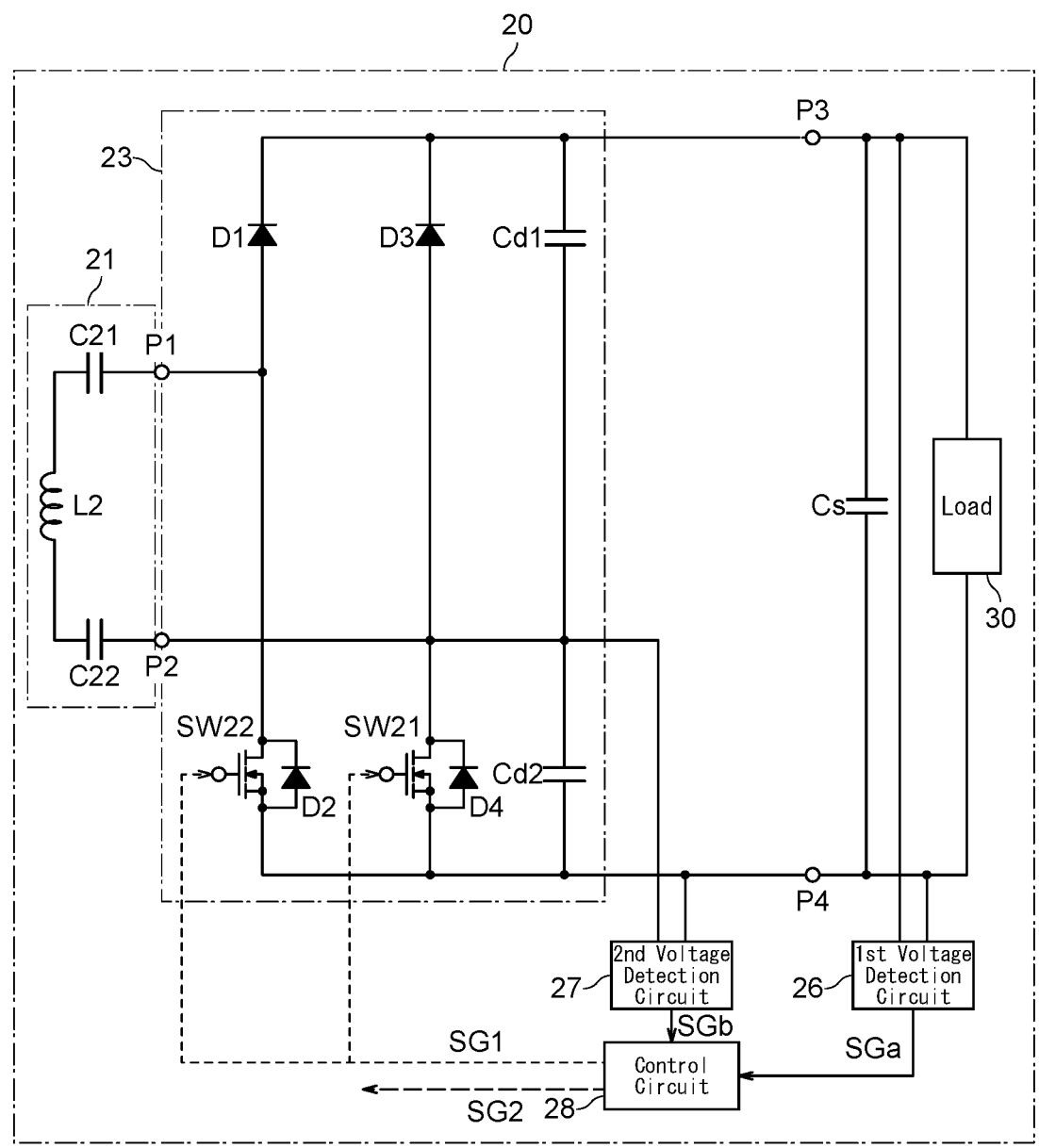
FIG. 17 is a circuit diagram illustrating the configuration of a wireless power receiver according to a fourth embodiment.

FIG. 17 is a circuit diagram illustrating the configuration of a wireless power receiver according to a fourth embodiment.

As illustrated in FIG. 17, the wireless power receiver 20 according to the present embodiment is featured in that the diodes D2 and D4 of the rectifier circuit 23 in the first embodiment are replaced, respectively, by switching elements SW22 and SW21 which are field effect transistors. This allows the rectifier circuit 23 to serve also as the protection circuit 25 and allows the body diodes of the field effect transistors constituting the switching elements SW22 and SW21 to function as the diodes D2 and D4 of the rectifier circuit 23 according to the first embodiment. As the switching elements SW21 and SW22, a MOSFET or an IGBT may be used. The control signal SG1 from the control circuit 28 is input to the input ends of the switching elements SW21 and SW22 constituting the rectifier circuit 23. According to the present embodiment, it is possible to produce the same effects as those obtained in the first embodiment. Further, it is possible to eliminate the need for providing an independent protection circuit to thereby achieve size and cost reduction.

Figure 18:
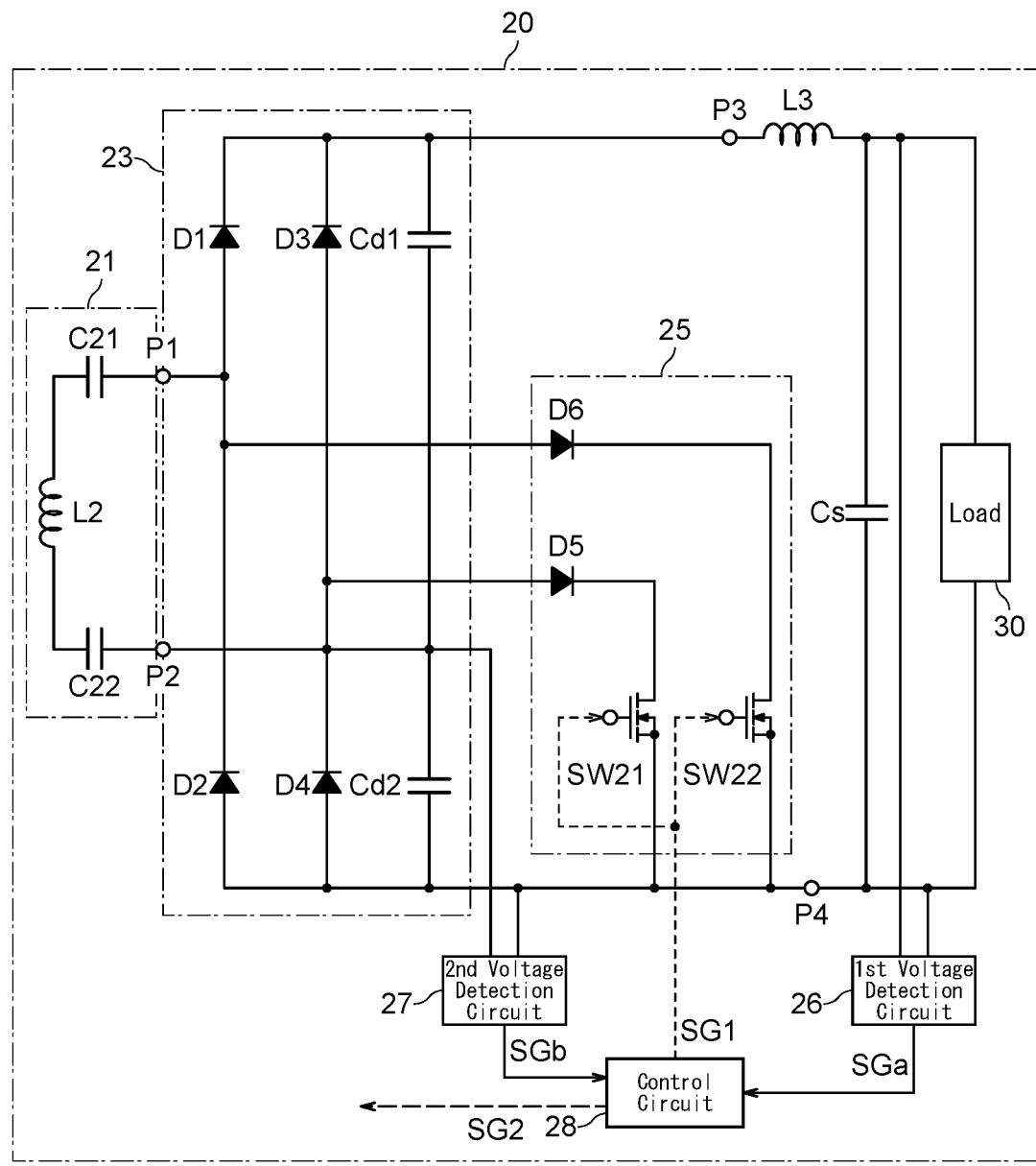
FIG. 18 is a circuit diagram illustrating the configuration of a wireless power receiver according to a fifth embodiment.

FIG. 18 is a circuit diagram illustrating the configuration of a wireless power receiver according to a fifth embodiment.

As illustrated in FIG. 18, a wireless power receiver 20 according to the present embodiment is featured in that a choke coil L3 is inserted in series with the output end P3 of the rectifier circuit 23. Other configurations are the same as those of the first embodiment. Thus, in the present embodiment, the smoothing capacitor Cs and the choke coil L3 are provided at the rear stage of the rectifier circuit 23, so that it is possible to suppress excessive current from flowing from the smoothing capacitor Cs to the switching element SW21 constituting the protection circuit 25.

Figure 19:
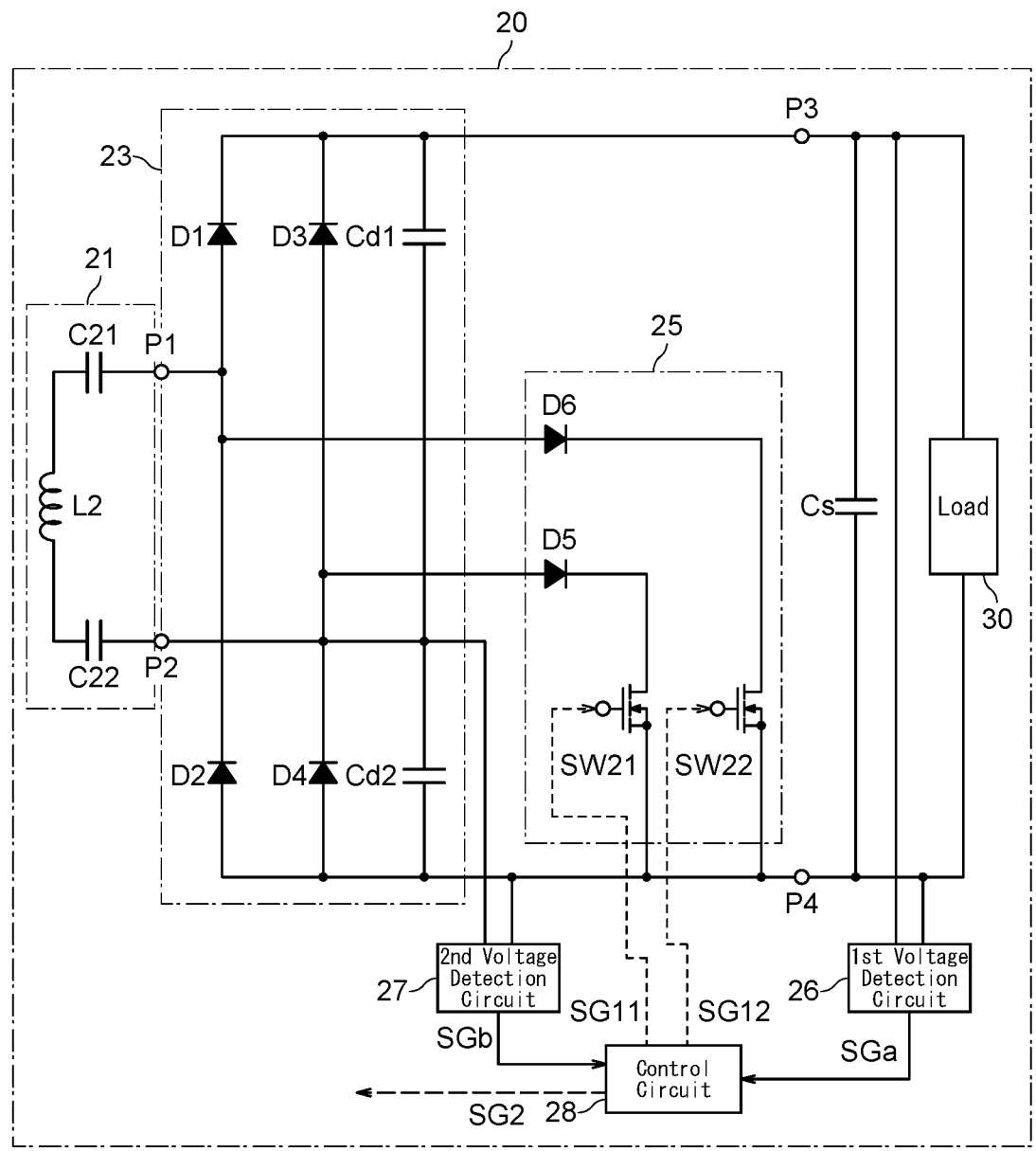
FIG. 19 is a circuit diagram illustrating the configuration of a wireless power receiver according to a sixth embodiment of the present invention.
Figure 20:
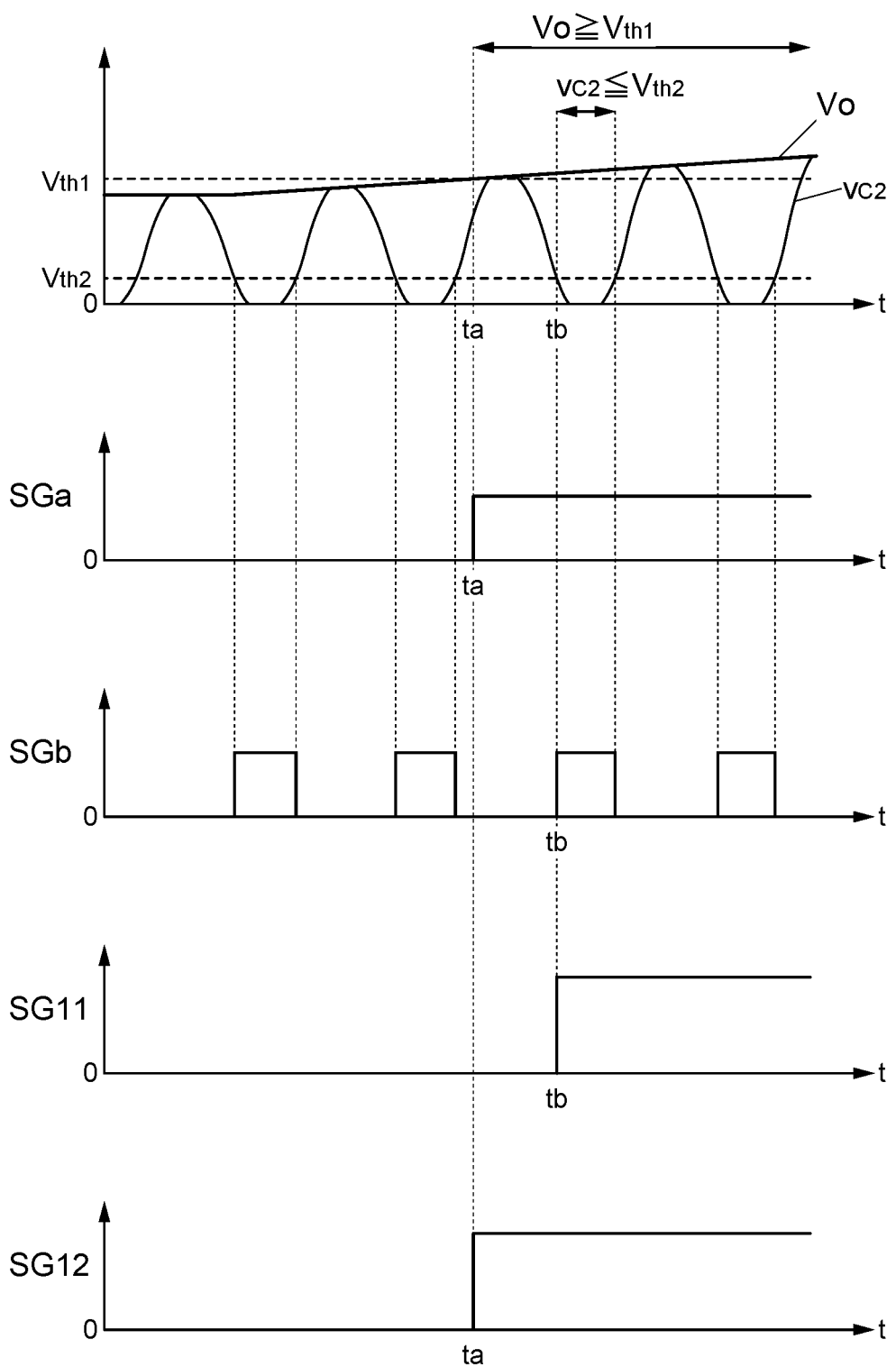
FIG. 20 is a signal waveform diagram illustrating the output voltage Vo of the rectifier circuit 23, inter-terminal voltage $v_{C2}$ of the second capacitor Cd2, and control signals SG11 and SG12 output from the control circuit 28.

FIG. 19 is a circuit diagram illustrating the configuration of a wireless power receiver according to a sixth embodiment of the present invention. FIG. 20 is a signal waveform diagram illustrating the output voltage Vo of the rectifier circuit 23, inter-terminal voltage $v_{C2}$ of the second capacitor Cd2, and control signals SG11 and SG12 output from the control circuit 28.

As illustrated in FIGS. 19 and 20, a wireless power receiver 20 according to the present embodiment is featured in that the switching elements SW21 and SW22 are driven independently of each other respectively by the control signals SG11 and SG12 output from the control circuit 28. The control circuit 28 outputs the control signal SG12 even when only the first detection signal SGa is active to thereby turn ON the switching element SW22. On the other hand, the control signal SG11 is output when both the first and second detection signals SGa and SGb are active to thereby turn ON the switching element SW21.

As illustrated in FIG. 20, the control circuit 28 turns ON the switching element SW22 when the output voltage Vo of the rectifier circuit 23 detected by the first voltage detection circuit 26 exceeds the first threshold voltage $V_{th1}$. Further, the control circuit 28 turns ON the switching element SW21 when the following two conditions are met: the output voltage Vo detected by the first voltage detection circuit 26 exceeds the first threshold voltage $V_{th1}$; and the inter-terminal voltage $v_{C2}$ of the second capacitor Cd2 detected by the second voltage detection circuit 27 falls below the second threshold voltage $V_{th2}$.

Thus, by turning ON the switching element SW22 immediately after the detection of the overvoltage of the output voltage Vo, it is possible to suppress an increase in the output voltage Vo even when the first and second capacitors Cd1 and Cd2 are operated as the double-voltage circuit and further to secure a path for discharging the charge of the second capacitor Cd2 when a current load is released to facilitate the discharge. Thus, the inter-terminal voltage of the second capacitor Cd2 can be reduced instantaneously.

Figure 21:
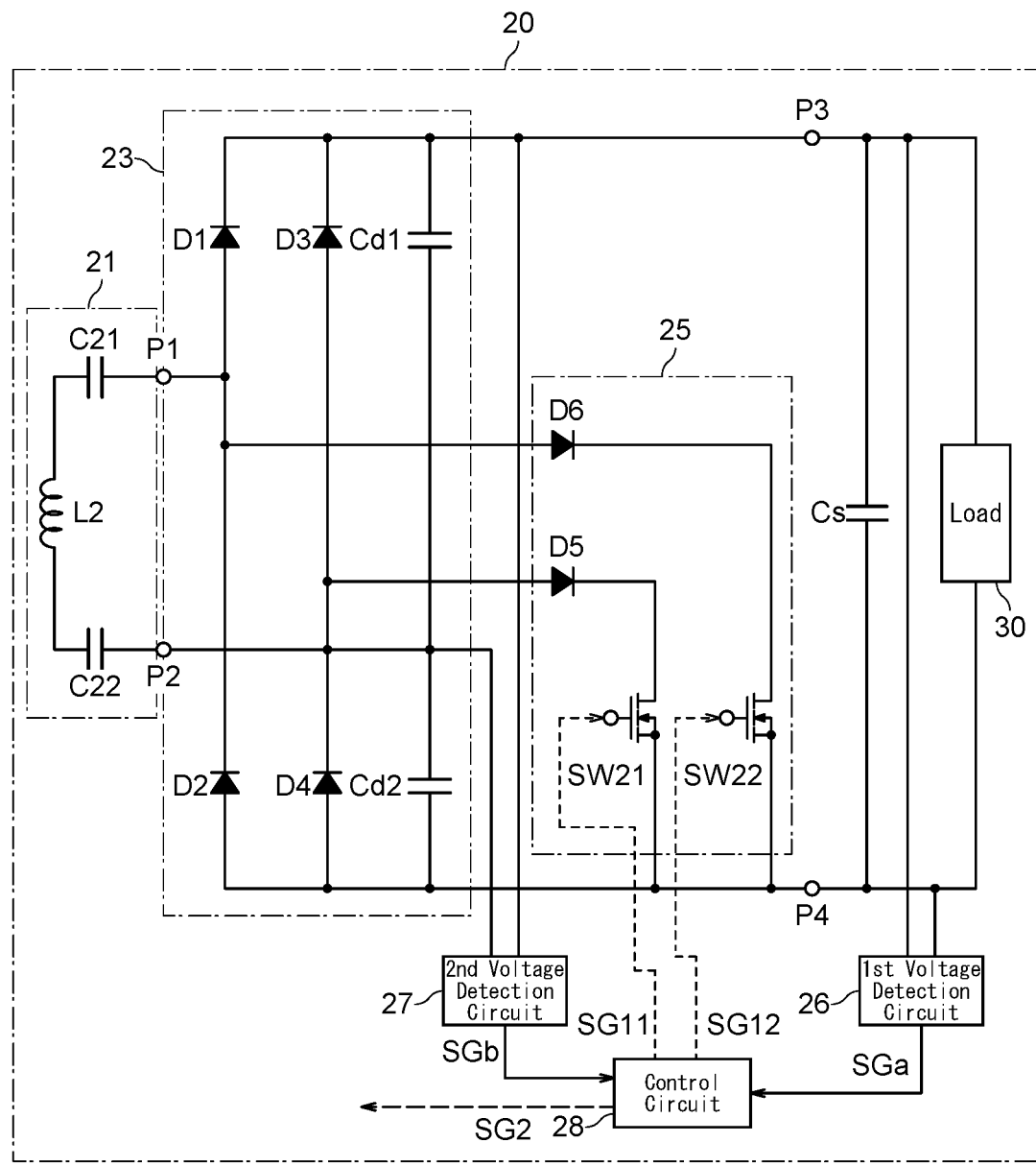
FIG. 21 is a circuit diagram illustrating the configuration of a wireless power receiver according to a seventh embodiment of the present invention.
Figure 22:
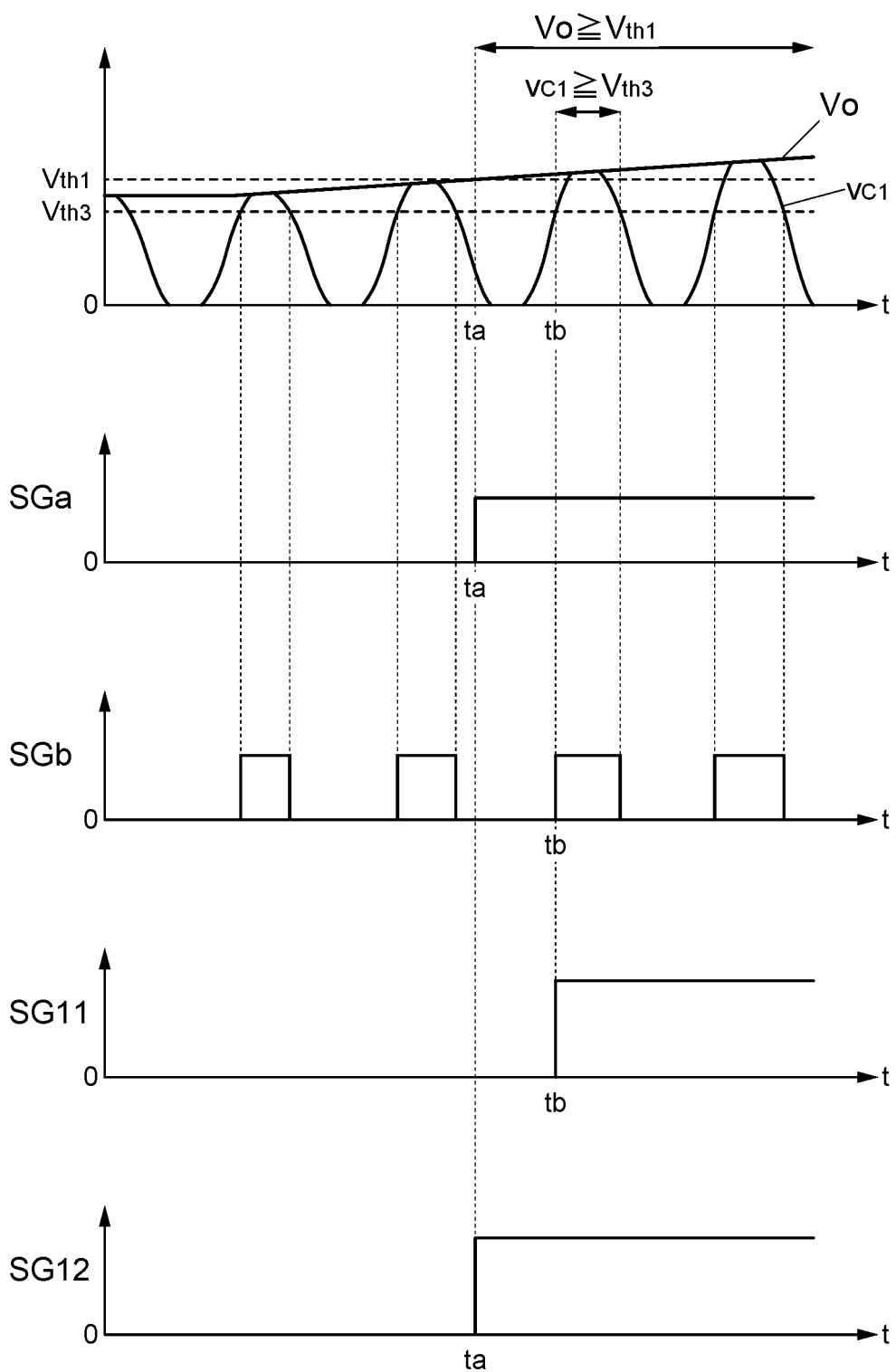
FIG. 22 is a signal waveform diagram illustrating the output voltage Vo of the rectifier circuit 23, inter-terminal voltage $v_{C1}$ of the first capacitor Cd1, and control signals SG11 and SG12 output from the control circuit 28.

FIG. 21 is a circuit diagram illustrating the configuration of a wireless power receiver according to a seventh embodiment of the present invention. FIG. 22 is a signal waveform diagram illustrating the output voltage Vo of the rectifier circuit 23, inter-terminal voltage $v_{C1}$ of the first capacitor Cd1, and control signals SG11 and SG12 output from the control circuit 28.

As illustrated in FIGS. 21 and 22, a wireless power receiver 20 according to the present embodiment is a modification of the sixth embodiment (FIGS. 19 and 20) and is featured in that the second voltage detection circuit 27 monitors not the inter-terminal voltage $v_{C2}$ of the second capacitor Cd2 but the inter-terminal voltage $v_{C1}$ of the first capacitor Cd1. Like the sixth embodiment, the switching elements SW21 and SW22 are driven independently of each other respectively by the control signals SG11 and SG12 output from the control circuit 28. The control circuit 28 outputs the control signal SG12 even when only the first detection signal SGa is active to thereby turn ON the switching element SW22. On the other hand, the control signal SG11 is output when both the first and second detection signals SGa and SGb are active to thereby turn ON the switching element SW21.

As illustrated in FIG. 22, the control circuit 28 turns ON the switching element SW22 when the output voltage Vo of the rectifier circuit 23 detected by the first voltage detection circuit 26 exceeds the first threshold voltage $V_{th1}$. Further, the control circuit 28 turns ON the switching element SW21 when the following two conditions are met: the output voltage Vo detected by the first voltage detection circuit 26 exceeds the first threshold voltage $V_{th1}$; and the inter-terminal voltage $v_{C1}$ of the first capacitor Cd1 detected by the second voltage detection circuit 27 exceeds the third threshold voltage $V_{th3}$.

Thus, by turning ON the switching element SW22 immediately after detection of the overvoltage of the output voltage Vo, it is possible to suppress an increase in the output voltage Vo even when the first and second capacitors Cd1 and Cd2 are operated as the double-voltage circuit and further to secure a path for discharging the charge of the second capacitor Cd2 when a current load is released to facilitate the discharge. Thus, the inter-terminal voltage of the second capacitor Cd2 can be reduced instantaneously.

Figure 23:
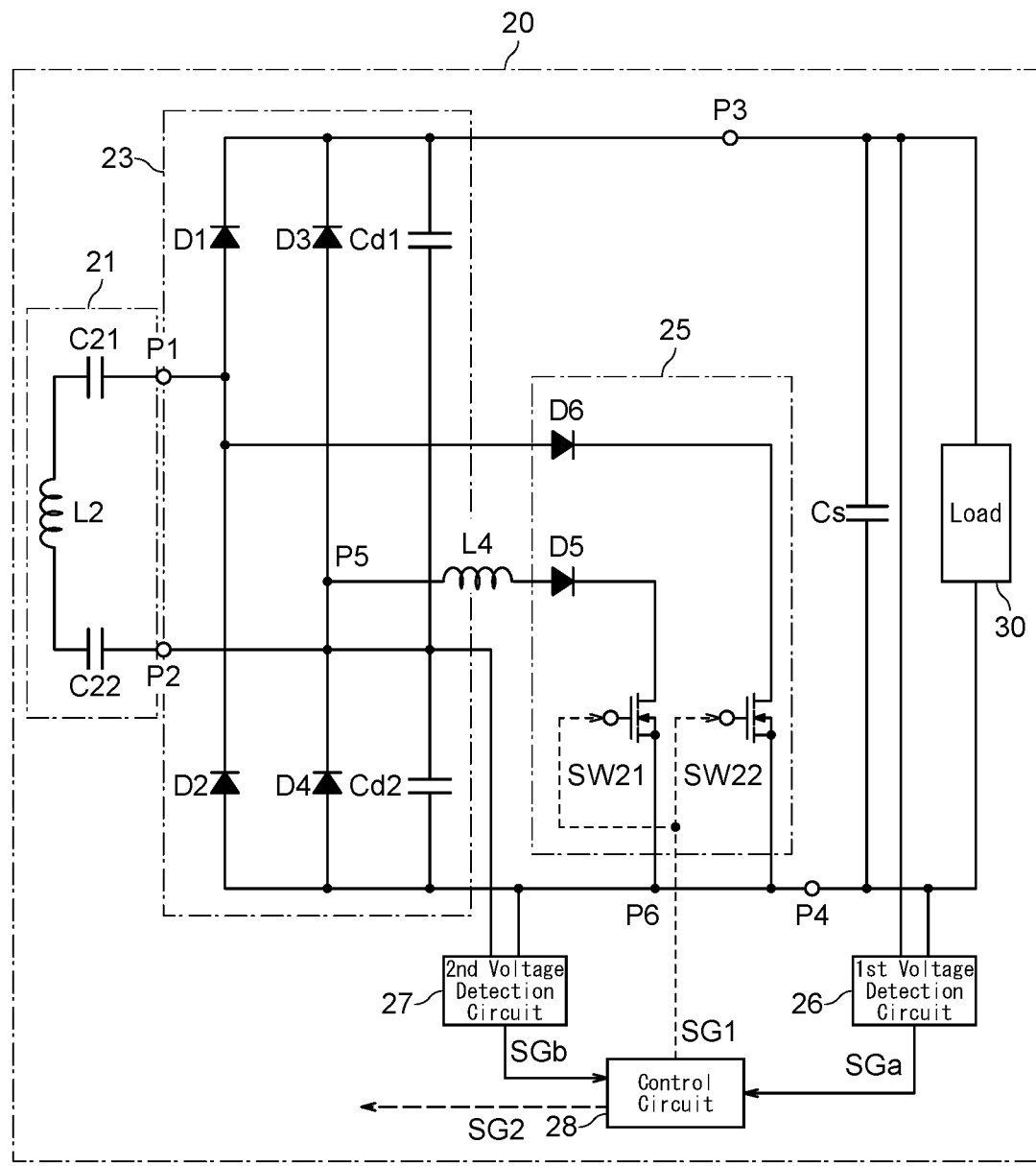
FIG. 23 is a circuit diagram illustrating the configuration of a wireless power receiver according to an eighth embodiment of the present invention.

FIG. 23 is a circuit diagram illustrating the configuration of a wireless power receiver according to an eighth embodiment of the present invention.

As illustrated in FIG. 23, a wireless power receiver 20 according to the present embodiment is featured in that an inductor element L4 is provided between a connection point P5 connecting the anode of the third diode D3 and cathode of the fourth diode D4 and a connection point P6 connecting the switching element SW21 and the output end of the rectifier circuit 23. Although the inductor element L4 is inserted between the connection point P5 and diode D5 in FIG. 23, it may be inserted between the diode D5 and switching element SW21 or between the switching element SW21 and the connection point P6. With this configuration, it is possible to mitigate overcurrent when the switching element SW21 is turned ON, to thereby prevent breakage of the switching element.

It is apparent that the present invention is not limited to the above embodiments, but may be modified and changed without departing from the scope and spirit of the invention.

For example, although the battery is exemplified as the load 30 in the above embodiment, the present invention is not limited to this, and various loads whose impedance is variable may be used as the load 30. Further, although the rectifier circuit of the present invention is used on the power receiver side of the wireless power transmission system, application of the rectifier circuit of the present invention is not limited to the wireless power transmission technology, and the rectifier circuit can be used in various applications.

As described above, according to the present embodiment, it is possible to, upon occurrence of overvoltage, suppress excessive current from flowing in the first switching element constituting the protection circuit while protecting circuit elements constituting the rectifier circuit and the like, thus making it possible to protect circuit elements constituting the protection circuit itself. Further, abnormality is detected to stop power transmission operation on the wireless power transmitter side, thus making it possible to quickly protect elements constituting the protection circuit on the wireless power receiver side.

In the present embodiment, the protection circuit preferably further includes a second switching element connected between the one output end of the power reception unit and the output end of the rectifier circuit, and the control circuit preferably controls the ON/OFF operation of the first and second switching elements based on the output voltage of the rectifier circuit and the inter-terminal voltage of the first capacitor or second capacitor. With this configuration, circuit elements constituting the protection circuit can be quickly protected.

In the present embodiment, the protection circuit preferably further includes a first rectifier element connected between the other output end of the power reception unit and the first switching element or between the first switching element and the output end of the rectifier circuit. With this configuration, it is possible to prevent the operation of the wireless power receiver from being unstable due to influence of the parasitic capacitance of the first switching element of the protection circuit during normal operation wherein the protection circuit is not being activated.

In the present embodiment, the protection circuit preferably further includes a first rectifier element connected between the other output end of the power reception unit and the first switching element or between the first switching element and the output end of the rectifier circuit and a second rectifier element connected between the one output end of the power reception unit and the second switching element or between the second switching element and the output end of the rectifier circuit. With this configuration, it is possible to prevent the operation of the wireless power receiver from being unstable due to the influence of the parasitic capacitance of the first and second switching elements of the protection circuit during normal operation wherein the protection circuit is not being activated.

In the present embodiment, the protection circuit preferably further includes a first rectifier element connected between the other output end of the power reception unit and the first switching element and a second rectifier element connected between the one output end of the power reception unit and the first switching element, and the first switching element is preferably connected to the other output end through the first rectifier element and to the one output end through the second rectifier element. With this configuration, it is possible to prevent the operation of the wireless power receiver from being unstable due to the influence of the parasitic capacitance of the first switching element of the protection circuit during normal operation wherein the protection circuit is not being activated. Further, since the protection circuit is constituted by using the single switching element, cost reduction and stabilization of control can be achieved.

In the present embodiment, the first switching element is preferably a first field effect transistor, the second switching element is preferably a second field effect transistor, the fourth diode is preferably a parasitic diode of the first field effect transistor, and the second diode is preferably a parasitic diode of the second field effect transistor. With this configuration, some elements constituting the rectifier circuit can be shared with the protection circuit. Thus, it is possible to eliminate the need for providing an independent protection circuit to thereby achieve size and cost reduction.

In the present embodiment, the wireless power receiver preferably further includes a first voltage detection circuit that detects the output voltage of the rectifier circuit; and a second voltage detection circuit that detects the inter-terminal voltage of the first capacitor or second capacitor, and the control circuit preferably controls the ON/OFF operation of the first switching element based on detection results from the first and second voltage detection circuits. With this configuration, the ON/OFF operation of the first switching element can be controlled based on the output voltage of the rectifier circuit and the inter-terminal voltage of the first capacitor or second capacitor.

In the present embodiment, the second voltage detection circuit is preferably configured to detect the inter-terminal voltage of the second capacitor, and the control circuit preferably turns ON the first switching element when the following two conditions are met: the voltage detected by the first voltage detection circuit exceeds a first threshold voltage; and the voltage detected by the second voltage detection circuit falls below a second threshold voltage. With this configuration, it is possible to further suppress excessive current from flowing into elements constituting the protection circuit.

In the present embodiment, the second threshold voltage is preferably set based on the rated current of the first switching element. With this configuration, it is possible to further suppress excessive current from flowing into elements constituting the protection circuit.

In the present embodiment, the second voltage detection circuit is preferably configured to detect the inter-terminal voltage of the first capacitor, and the control circuit preferably turns ON the first switching element when the following two conditions are met: the voltage detected by the first voltage detection circuit exceeds the first threshold voltage; and the voltage detected by the second voltage detection circuit exceeds a third threshold voltage. With this configuration, it is possible to further suppress excessive current from flowing into elements constituting the protection circuit.

In the present embodiment, the third threshold voltage is preferably set based on the rated current of the first switching element. With this configuration, it is possible to further suppress excessive current from flowing into elements constituting the protection circuit.

In the present embodiment, the control circuit preferably outputs a power transmission stop signal instructing the stop of power transmission operation when the voltage detected by the first voltage detection circuit exceeds the first threshold voltage. With this configuration, elements constituting the protection circuit can be quickly protected.

The wireless power receiver according to the present embodiment preferably further includes a first voltage detection circuit that detects the output voltage of the rectifier circuit; and a second voltage detection circuit that detects the inter-terminal voltage of the second capacitor, and the control circuit preferably turns ON the second switching element when the voltage detected by the first voltage detection circuit exceeds a first threshold voltage and turns ON the first switching element when the following two conditions are met: the voltage detected by the first voltage detection circuit exceeds the first threshold voltage; and the voltage detected by the second voltage detection circuit falls below a second threshold voltage. By turning ON the second switching element immediately after detection of the overvoltage of the output voltage, it is possible to suppress an increase in the output voltage even when the first and second capacitors are operated as a double-voltage circuit and further to secure a path for discharging the charge of the second capacitor when a current load is released to facilitate the discharge. Thus, the inter-terminal voltage of the second capacitor can be reduced instantaneously.

The wireless power receiver preferably further includes a first voltage detection circuit that detects the output voltage of the rectifier circuit and a second voltage detection circuit that detects the inter-terminal voltage of the first capacitor, and the control circuit preferably turns ON the second switching element when the voltage detected by the first voltage detection circuit exceeds a first threshold voltage and turns ON the first switching element when the following two conditions are met: the voltage detected by the first voltage detection circuit exceeds the first threshold voltage; and the voltage detected by the second voltage detection circuit exceeds a third threshold voltage. By turning ON the second switching element immediately after detection of the overvoltage of the output voltage, it is possible to suppress an increase in the output voltage even when the first and second capacitors are operated as a double-voltage circuit and further to secure a path for discharging the charge of the second capacitor when a current load is released to facilitate the discharge. Thus, the inter-terminal voltage of the second capacitor can be reduced instantaneously.

Assuming that the frequency of the AC power is f, and the maximum resistance value of the load is $R_{Lmax}$, an electrostatic capacitance $C_1$ of the first capacitor and an electrostatic capacitance $C_2$ of the second capacitor are each preferably smaller than $1/(2fR_{Lmax})$ ($C_1$, $C_2 < 1/(2fR_{Lmax})$). With this configuration, the rectifier circuit can be operated as a bridge rectifier circuit or a double-voltage rectifier circuit, and the time ratio between a bridge rectifier mode in which the rectifier circuit is operated as the bridge rectifier circuit and a double-voltage rectifier mode in which the rectifier circuit is operated as the double-voltage rectifier circuit can be passively changed in accordance with a variation in the impedance of the load connected to the output of the rectifier circuit. That is it is possible to extend the operation time of the bridge rectifier mode when the load impedance is low and to extend the operation time of the double-voltage rectifier mode when the load impedance is high. Thus, it is possible to suppress a variation in the impedance of the load as viewed from the input side of the rectifier circuit without separately providing an impedance converter requiring active control.

The electrostatic capacitance $C_1$ of the first capacitor and the electrostatic capacitance $C_2$ of the second capacitor are each preferably larger than $1/(80 \times 2fR_{Lmax})$ ($C_1$, $C_2 > 1/(80 \times 2fR_{Lmax})$). With this configuration, the upper limit of the time ratio of the double-voltage rectifier mode to the half cycle of the AC power input to the rectifier circuit can be set to a value greater than 10%, thereby allowing the two modes to be operated at an appropriate time ratio within the variation range of the load impedance, which can further enhance suppression effect of a variation in the load impedance.

The wireless power receiver according to the present embodiment preferably further includes a smoothing capacitor connected in parallel to the output end of the rectifier circuit and a choke coil provided between the output end of the rectifier circuit and the smoothing capacitor. With this configuration, it is possible to suppress excessive current from flowing in circuit elements constituting the protection circuit.

The wireless power receiver according to the present embodiment preferably further includes an inductor element provided between a connection point connecting the anode of the third diode and the cathode of the fourth diode and a connection point connecting the first switching element and the output end of the rectifier circuit. With this configuration, it is possible to mitigate overcurrent when the first switching element is turned ON, to thereby prevent breakage of the switching element.

According to the present embodiments, there can be provided a wireless power receiver and a wireless power transmission system capable of, upon occurrence of overvoltage, protecting circuit elements constituting the protection circuit itself while protecting circuit elements constituting the device.

What is claimed is:

1. A wireless power receiver comprising:
   a power reception unit including a power reception coil;
   a rectifier circuit including a first diode whose anode is connected to one output end of the power reception unit, a second diode whose cathode is connected to the one output end, a third diode whose anode is connected to the other output end of the power reception unit, a fourth diode whose cathode is connected to the other output end, and first and second capacitors connected in parallel, respectively, to the third and fourth diodes and configured to convert AC power received by the power reception coil into DC power;
   a protection circuit including a first switching element connected between the other output end of the power reception unit and an output end of the rectifier circuit; and
   a control circuit that controls ON/OFF operation of the first switching element based on an output voltage of the rectifier circuit and an inter-terminal voltage of the first capacitor or second capacitor.

2. The wireless power receiver as claimed in claim 1, wherein
   the protection circuit further includes a second switching element connected between the one output end of the power reception unit and the output end of the rectifier circuit, and
   the control circuit controls the ON/OFF operation of the first and second switching elements based on the output voltage of the rectifier circuit and the inter-terminal voltage of the first capacitor or second capacitor.

3. The wireless power receiver as claimed in claim 1, wherein the protection circuit further includes a first rectifier element connected between the other output end of the power reception unit and the first switching element or between the first switching element and the output end of the rectifier circuit.

4. The wireless power receiver as claimed in claim 2, wherein
   the protection circuit further includes
   a first rectifier element connected between the other output end of the power reception unit and the first switching element or between the first switching element and the output end of the rectifier circuit and
   a second rectifier element connected between the one output end of the power reception unit and the second switching element or between the second switching element and the output end of the rectifier circuit.

5. The wireless power receiver as claimed in claim 1, wherein
   the protection circuit further includes
   a first rectifier element connected between the other output end of the power reception unit and the first switching element and
   a second rectifier element connected between the one output end of the power reception unit and the first switching element, and
   the first switching element is connected to the other output end through the first rectifier element and to the one output end through the second rectifier element.

6. The wireless power receiver as claimed in claim 2, wherein
   the first switching element is a first field effect transistor,
   the second switching element is a second field effect transistor,
   the fourth diode is a parasitic diode of the first field effect transistor, and
   the second diode is a parasitic diode of the second field effect transistor.

7. The wireless power receiver as claimed in claim 1 further comprising:
   a first voltage detection circuit that detects the output voltage of the rectifier circuit; and
   a second voltage detection circuit that detects the inter-terminal voltage of the first capacitor or second capacitor, wherein
   the control circuit controls the ON/OFF operation of the first switching element based on detection results from the first and second voltage detection circuits.

8. The wireless power receiver as claimed in claim 7, wherein
   the second voltage detection circuit is configured to detect the inter-terminal voltage of the second capacitor, and
   the control circuit turns ON the first switching element when the voltage detected by the first voltage detection circuit exceeds a first threshold voltage and the voltage detected by the second voltage detection circuit falls below a second threshold voltage.

9. The wireless power receiver as claimed in claim 8, wherein the second threshold voltage is set based on the rated current of the first switching element.

10. The wireless power receiver as claimed in claim 7, wherein
    the second voltage detection circuit is configured to detect the inter-terminal voltage of the first capacitor, and
    the control circuit turns ON the first switching element when the voltage detected by the first voltage detection circuit exceeds the first threshold voltage and the voltage detected by the second voltage detection circuit exceeds a third threshold voltage.

11. The wireless power receiver as claimed in claim 10, wherein the third threshold voltage is set based on the rated current of the first switching element.

12. The wireless power receiver as claimed in claim 7, wherein
the control circuit outputs a power transmission stop signal instructing the stop of power transmission operation when the voltage detected by the first voltage detection circuit exceeds the first threshold voltage.

13. The wireless power receiver as claimed in claim 2 further comprising:
a first voltage detection circuit that detects the output voltage of the rectifier circuit; and
a second voltage detection circuit that detects the inter-terminal voltage of the second capacitor, wherein
the control circuit turns ON the second switching element when the voltage detected by the first voltage detection circuit exceeds a first threshold voltage and turns ON the first switching element when the voltage detected by the first voltage detection circuit exceeds the first threshold voltage and the voltage detected by the second voltage detection circuit falls below a second threshold voltage.

14. The wireless power receiver as claimed in claim 2 further comprising:
a first voltage detection circuit that detects the output voltage of the rectifier circuit; and
a second voltage detection circuit that detects the inter-terminal voltage of the first capacitor, wherein
the control circuit turns ON the second switching element when the voltage detected by the first voltage detection circuit exceeds a first threshold voltage and turns ON the first switching element when the voltage detected by the first voltage detection circuit exceeds the first threshold voltage and the voltage detected by the second voltage detection circuit exceeds a third threshold voltage.

15. The wireless power receiver as claimed in claim 1, wherein
when the frequency of the AC power is f and the maximum resistance value of the load is $R_{Lmax}$, an electrostatic capacitance $C_1$ of the first capacitor and an electrostatic capacitance $C_2$ of the second capacitor are each smaller than $1/(2fR_{Lmax})$.

16. The wireless power receiver as claimed in claim 15, wherein the electrostatic capacitance $C_1$ of the first capacitor and the electrostatic capacitance $C_2$ of the second capacitor are each larger than $1/(80 \times 2fR_{Lmax})$.

17. The wireless power receiver as claimed in claim 1 further comprising:
a smoothing capacitor connected in parallel to the output end of the rectifier circuit; and
a choke coil provided between the output end of the rectifier circuit and the smoothing capacitor.

18. The wireless power receiver as claimed in claim 1, wherein further includes an inductor element provided between a connection point connecting the anode of the third diode and the cathode of the fourth diode and a connection point connecting the first switching element and the output end of the rectifier circuit.

19. A wireless power transmission system comprising:
a wireless power transmitter; and
a wireless power receiver, wherein
the wireless power transmitter includes:
an inverter that converts DC power into AC power;
a power transmission unit including a power transmission coil that receives the AC power and generates an AC magnetic field;
a current detection circuit that detects current output from the inverter; and
a power transmission control circuit that controls the operation of the inverter, and
the power transmission control circuit stops the operation of the inverter when the current detected by the current detection circuit exceeds a threshold current,
the wireless power receiver includes:
a power reception unit including a power reception coil;
a rectifier circuit including first to fourth diodes and first and second capacitors and converting AC power into DC power, an anode of the first diode and a cathode of the second diode being connected to one output end of the power reception unit, an anode of the third diode and a cathode of the fourth diode being connected to the other output end of the power reception unit, and first and second capacitors being connected in parallel, respectively, to the third and fourth diodes;
a protection circuit including a first switching element connected between the other output end of the power reception unit and an output end of the rectifier circuit; and
a control circuit that controls ON/OFF operation of the first switching element based on an output voltage of the rectifier circuit and an inter-terminal voltage of the first or second capacitor.

* * * * *